(12) United States Patent
Error et al.

(10) Patent No.: US 9,081,863 B2
(45) Date of Patent: Jul. 14, 2015

(54) ONE-CLICK SEGMENTATION DEFINITION

(75) Inventors: Brett Michael Error, Orem, UT (US); Catherine Jen Wong, Provo, UT (US)

(73) Assignee: Adobe Systems Incorporated, San Jose, CA (US)

( * ) Notice: Subject to any disclaimer, the term of this patent is extended or adjusted under 35 U.S.C. 154(b) by 993 days.

(21) Appl. No.: 11/313,970

(22) Filed: Dec. 20, 2005

(65) Prior Publication Data

US 2006/0277198 A1    Dec. 7, 2006

Related U.S. Application Data

(63) Continuation-in-part of application No. 11/313,588, filed on Dec. 20, 2005.

(60) Provisional application No. 60/687,626, filed on Jun. 3, 2005, provisional application No. 60/687,285, filed on Jun. 3, 2005.

(51) Int. Cl.
*G06F 17/30* (2006.01)

(52) U.S. Cl.
CPC .................................. *G06F 17/3089* (2013.01)

(58) Field of Classification Search
CPC .................................................. G06F 17/3089
USPC ............ 707/1–10, 100–104.1, 200–205, 711, 707/740; 709/224
See application file for complete search history.

(56) References Cited

U.S. PATENT DOCUMENTS

| 5,760,772 A | 6/1998 | Austin |
| 5,796,402 A | 8/1998 | Ellison-Taylor |
| 5,821,931 A | 10/1998 | Berquist et al. |
| 5,835,087 A | 11/1998 | Herz et al. |
| 5,870,559 A | 2/1999 | Leshem et al. |
| 5,966,139 A | 10/1999 | Anupam et al. |
| 6,008,809 A | 12/1999 | Brooks |
| 6,026,397 A | 2/2000 | Sheppard |
| 6,182,097 B1 | 1/2001 | Hansen et al. |
| 6,188,405 B1 | 2/2001 | Czerwinski et al. |

(Continued)

FOREIGN PATENT DOCUMENTS

| GB | 2329492 | 3/1999 |
| JP | 1999041363 | 2/1999 |

(Continued)

OTHER PUBLICATIONS

U.S. Appl. No. 10/113,808, filed Mar. 29, 2002, Wiles, Jr.

(Continued)

*Primary Examiner* — Hosain Alam
*Assistant Examiner* — Navneet K Ahluwalia
(74) *Attorney, Agent, or Firm* — Kilpatrick Townsend & Stockton LLP

(57) ABSTRACT

A system displays and filters reports including website vitiation data in response to receiving user input. The system allows users to launch various reports onto a workspace and filter the entire result set by selected criteria. The system allows the user to specify and configure segments while viewing reports, simply by clicking next to the desired criteria within the report alone or in combination with various keyboard functions. Filtered reports can be further adjusted per additional filters and criteria. The results are returned virtually instantaneously, enabling users to analyze the effects of combinations of factors.

14 Claims, 18 Drawing Sheets

(56) References Cited

U.S. PATENT DOCUMENTS

| | | | |
|---|---|---|---|
| 6,266,649 | B1 | 7/2001 | Linden et al. |
| 6,310,631 | B1 | 10/2001 | Cecco et al. |
| 6,317,787 | B1 | 11/2001 | Boyd et al. |
| 6,393,479 | B1 | 5/2002 | Glommen et al. |
| 6,414,677 | B1 | 7/2002 | Robertson et al. |
| 6,470,383 | B1 * | 10/2002 | Leshem et al. ............... 709/223 |
| 6,473,102 | B1 | 10/2002 | Rodden et al. |
| 6,473,738 | B1 | 10/2002 | Garrett et al. |
| 6,486,882 | B1 | 11/2002 | Wolverton et al. |
| 6,489,968 | B1 | 12/2002 | Ortega et al. |
| 6,654,036 | B1 | 11/2003 | Jones |
| 6,671,711 | B1 | 12/2003 | Pirolli et al. |
| 6,704,016 | B1 | 3/2004 | Oliver et al. |
| 6,754,873 | B1 | 6/2004 | Law et al. |
| 6,766,370 | B2 | 7/2004 | Glommen et al. |
| 6,789,115 | B1 | 9/2004 | Singer et al. |
| 6,850,988 | B1 | 2/2005 | Reed |
| 6,862,574 | B1 | 3/2005 | Srikant et al. |
| 6,912,534 | B2 | 6/2005 | DeBettencourt et al. |
| 6,950,993 | B2 | 9/2005 | Breinberg |
| 6,963,874 | B2 | 11/2005 | Kasriel et al. |
| 6,968,511 | B1 | 11/2005 | Robertson et al. |
| 7,085,682 | B1 * | 8/2006 | Heller et al. ................... 702/186 |
| 2002/0040395 | A1 | 4/2002 | Davis et al. |
| 2002/0042750 | A1 | 4/2002 | Morrison |
| 2002/0087621 | A1 | 7/2002 | Hendriks |
| 2002/0091591 | A1 | 7/2002 | Tsumura et al. |
| 2002/0093529 | A1 | 7/2002 | Daoud et al. |
| 2002/0099812 | A1 | 7/2002 | Davis et al. |
| 2002/0143662 | A1 | 10/2002 | Clark et al. |
| 2002/0152284 | A1 | 10/2002 | Cambray et al. |
| 2002/0165936 | A1 | 11/2002 | Alston et al. |
| 2002/0186237 | A1 | 12/2002 | Bradley et al. |
| 2002/0186253 | A1 | 12/2002 | Rodden et al. |
| 2002/0198939 | A1 | 12/2002 | Lee et al. |
| 2003/0023712 | A1 | 1/2003 | Zhao et al. |
| 2003/0025737 | A1 | 2/2003 | Breinberg |
| 2003/0055883 | A1 | 3/2003 | Wiles, Jr. |
| 2003/0110249 | A1 | 6/2003 | Buus et al. |
| 2003/0128231 | A1 | 7/2003 | Kasriel et al. |
| 2003/0130982 | A1 * | 7/2003 | Kasriel et al. ..................... 707/1 |
| 2003/0131097 | A1 | 7/2003 | Kasriel et al. |
| 2004/0059746 | A1 * | 3/2004 | Error et al. ..................... 707/102 |
| 2004/0070606 | A1 * | 4/2004 | Yang et al. ..................... 345/745 |
| 2004/0133671 | A1 | 7/2004 | Taniguchi |
| 2004/0174397 | A1 * | 9/2004 | Cereghini et al. .............. 345/855 |
| 2004/0205157 | A1 | 10/2004 | Bibelnieks et al. |
| 2004/0225687 | A1 | 11/2004 | Larsson et al. |
| 2005/0044508 | A1 | 2/2005 | Stockton |
| 2005/0204307 | A1 | 9/2005 | Nadal |
| 2005/0229110 | A1 | 10/2005 | Gegner et al. |
| 2005/0235222 | A1 | 10/2005 | Barbanson et al. |
| 2005/0273727 | A1 | 12/2005 | Barbanson et al. |
| 2005/0289137 | A1 * | 12/2005 | Wu et al. ........................... 707/4 |
| 2006/0143162 | A1 * | 6/2006 | Bernacki et al. ................. 707/3 |
| 2006/0271671 | A1 * | 11/2006 | Hansen ........................ 709/224 |

FOREIGN PATENT DOCUMENTS

| | | |
|---|---|---|
| JP | 2003524830 | 8/2003 |
| WO | WO 00/58866 | 10/2000 |
| WO | WO 02/23438 A2 | 3/2002 |
| WO | 03/105024 | 12/2003 |

OTHER PUBLICATIONS

U.S. Appl. No. 10/113,322, filed Mar. 29, 2002, Zhao et al.

U.S. Appl. No. 10/057,513, filed Jan. 25, 2002, Alston et al.

U.S. Appl. No. 09/835,112, filed Apr. 13, 2001, Cambray et al.

Hong, J. et al., "What Did They Do? Understanding Clickstreams with the WebQuilt Visualization System," WebQuilt homepage http://guir.berkeley.edu/projects/webquilt/, pp. 1-7.

Hong, J. et al., "WebQuilt: A Framework for Capturing and Visualizing the Web Experience," WebQuilt, homepage: http://guir.berkeley.edu/projects/webquilt/, May 1-5, 2001, pp. 1-8.

Notification of International Search Report and Written Opinion, PCT/US04/39253, Dec. 13, 2005, 13 pages.

Supplementary European Search Report, EP 04717485, Nov. 7, 2006, 3 pages.

Notification of International Search Report and Written Opinion, PCT/US04/06898, Feb. 9, 2005, 8 pages.

Notification of International Search Report and Written Opinion, PCT/US04/06696, Feb. 28, 2005, 9 pages.

International Search Report and Written Opinion, PCT/US06/20548, Sep. 19, 2007, 10 pages.

International Search Report and Written Opinion, PCT/US06/21937, Sep. 25, 2007, 8 pages.

Chinese Office Action, Chinese Application No. 200480034359.5, Jan. 25, 2008, 10 pages.

PCT International Search Report and Written Opinion, PCT/US06/20550, Jun. 17, 2008, 8 pages.

Extended European Search Report, European Application No. EP 06772307.2, Jan. 12, 2009, 9 pages.

Extended European Search Report, European Application No. EP06826800.2, Jan. 12, 2009, 8 pages.

"WebTrends 7 Report User's Guide," Mar. 2005, pp. I-VIII, 1-82, [Online] [Retrieved on Dec. 15, 2008] Retrieved from the Internet<URL:http://product.webtrends.com/WRC/7.1/Documents/ReportUsersGuide.pdf>.

"WebTrends Guide to Web Analytics," Jan. 2005, pp. I-X, 1-224, [Online] [Retrieved on Dec. 15, 2008] Retrieved from the Internet<URL:http://product.webtrends.com/WRC/7.1/Documents/WebAnalytics.pdf>.

Chinese Second Office Action, Chinese Application No. 200480034359.5, Mar. 13, 2009, 7 pages.

European Search Report from Application No. 06771361.0-1225 / 1891555 PCT/US2006020548, mailed Jul. 5, 2010, 8 pages.

Office Action from Application No. JP2008-514721, mailed Jun. 7, 2011, Amazon Technologies, Inc., English Translation, 2 pages, non-translated copy 5 pages.

* cited by examiner

ONE-CLICK SEGMENTATION DEFINITION

RELATED APPLICATIONS

This application claims priority under 35 U.S.C. §119 from U.S. Provisional Application Ser. No. 60/687,626, filed Jun. 3, 2005 by Brett Error, entitled "Incrementally Adding Segmentation Criteria to a Data Set," and U.S. Provisional Application Ser. No. 60/687,285, filed Jun. 3, 2005 by Catherine Wong, entitled "One-Click Segment Definition,", and claims priority under §120 as a Continuation-In-Part of U.S. patent application Ser. No. 11/313,588, filed Dec. 20, 2005 by Brett M. Error, entitled "Incrementally Adding Segmentation Criteria to a Data Set,", and is related to U.S. patent application Ser. No. 10/993,397, filed Nov. 18, 2004 by Brett M. Error et al., entitled "Assigning Value to Elements Contributing to Business Success," and U.S. patent application Ser. No. 10/609,008, filed Jun. 27, 2003 by Brett Error et al., entitled "Capturing and Presenting Site Visitation Path Data,", each incorporated herein by reference.

FIELD OF THE INVENTION

The present invention relates generally to website usage tracking, and more specifically to improved techniques for presenting and filtering website visitation data.

BACKGROUND

One of the most common sales mantras is "know your customer." This basic tenet of selling has grown far beyond knowing who enters the store; it requires among other things, knowing what attracts customers, what they look at, how they move around a marketplace, and how long they stay. By studying customer buying habits, retailers have been able to maximize their revenues through tailoring their promotions, offerings, and even store layouts to suit their customers' preferences and habits.

Thus, website providers often wish to collect data that describes usage and visitation patterns for their websites and for individual web pages within the sites. Such information can be extremely valuable in developing usage statistics for various purposes, including for example estimating server load, determining advertising rates, identifying areas of websites that are in need of redesign, and the like.

Often, a user who wishes to analyze website traffic is interested in a particular segment of visits and/or visitors. A segment is defined in one embodiment as the website traffic data that is provided or shown after a filter has been applied to a set of data. In another embodiment, a segment is defined to be a subset of visitors/visits.

Such information is useful in many ways, including for example collecting feedback that leads to improved web page design, determining the effect of various degrees of prominence of links and graphic elements on web pages, and determining the contribution of individual links to an eventual sale.

Users, such as website administrators, often wish to filter and aggregate the results in many different ways. However, existing reporting systems do not allow the user to easily customize and filter results. Thus, much of the business utility of tracking website visitor/customer visitation data is lost using existing systems. Therefore, what is needed is an improved report format that visually depicts web page element usage and valuation statistics.

SUMMARY

The present invention provides a fast, responsive way for users to perform advanced analysis on data via a graphical user interface. Users can launch various pre-packaged reports onto a single workspace and easily click on any data item to filter the result set of all reports by that item. This allows users to quickly answer questions such as "What were the top referrers that drove visits in which the visitor purchased Item X or Item Y and viewed the Clearance Sale page?" The results are returned almost instantaneously, enabling users to analyze the effects of combinations of factors.

When viewing reports describing website visitation statistics, users often wish to filter and aggregate the results in many different ways. The present invention provides a flexible, easy-to-use mechanism for dynamically specifying filter criteria that provides virtually instantaneous feedback and allows the user to quickly add or remove filters to see results in whatever form he or she wishes.

The present invention includes a user interface that allows the user, while viewing a report, to click on additional filter criteria. The report is then updated virtually instantaneously so that it only includes report data that fit the specified criteria. Thus, the user can select various reports, add filter criteria by clicking on elements within the reports, and quickly see the resulting changes in the output.

The present invention allows the user to specify and configure segments specified without entering a separate screen or mode for specifying segments. Rather, the user can define segments while viewing reports, simply using input operations, e.g., by clicking and/or shift-clicking next to the desired criteria within the report.

These aspects of the present invention provide greater visibility of the information generated by the above-described methods, providing the website owner valuable insight into which elements of a website are contributing to the success of the site and contributing to return on investment.

The description in the specification is not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

FIG. 3D illustrates a user interface for incrementally adding segmentation criteria to a data set according to one embodiment of the present invention.

FIG. 4B illustrates the user interface of FIG. 4A with two filters applied via an AND combination.

FIG. 4C illustrates the user interface of FIG. 4B with an additional filter applied via an AND combination.

FIG. 4E illustrates the user interface of FIG. 4D with an additional filter applied via an AND combination.

Figure 1:
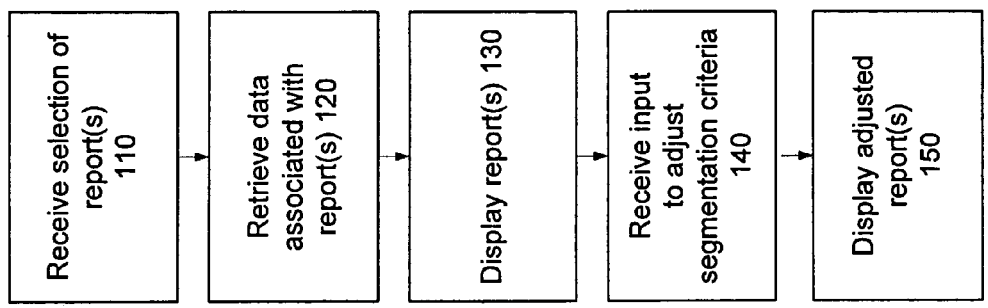
FIG. 1 is a flowchart illustrating a method of incrementally adding segmentation criteria to a data set according to one embodiment of the present invention.

One skilled in the art will readily recognize from the following discussion that alternative embodiments of the structures and methods illustrated herein may be employed without departing from the principles of the invention described herein.

DETAILED DESCRIPTION OF THE EMBODIMENTS

The following description sets forth an embodiment wherein the invention takes place in the context of reporting of website visitation data gathered in the course of an online purchase. However, the description is merely illustrative of the techniques of the invention; one skilled in the art will recognize that the techniques of the invention can be applied in any context wherein it is desirable to filter website visitation data.

In the course of purchasing an item from an online retailer, a visitor/customer generally follows a basic path. The visitor enters a website (by, for example, typing the URL for the website, or selected from a Favorites menu, or clicking on a link) and is presented with a home page for the online retailer. During the process, the visitor generally is presented with an item description. If the visitor wants to buy the item, he or she clicks on an "Add to Cart" link and navigates to a Checkout page and then to a page for entering billing and shipping information. After entering such information, the visitor generally is presented with a confirmation page where he or she is given the opportunity to review the order and finalize it before exiting the website. Analysis of visitor navigation through such sequence is extremely valuable to website administrators.

Techniques for collecting site path sequences are known in the art. A particular visitor is recognized as he or she moves from page to page; the mechanics of visitor tracking are known in the art and need not be described in detail here. Visitor/customer web page visit records are stored in sequence according to they time that they occurred. Each visitation record typically contains two types of information: an identifier of the page visited, and metadata that provides further criteria for filtering and analyzing the sequential data.

In some contexts, certain elements of the visitor navigation are designated as "checkpoints," meaning that they are of importance in analyzing website visitation paths. Generally, all instances of a particular sequence of checkpoints are considered to be equivalent, regardless of the presence or absence of any other (non-checkpoint) nodes within the sequences.

Greater detail regarding the use of checkpoints can be found in co-pending U.S. >patent application Ser. No. 10/609,008, filed Jun. 27, 2003 by Brett Error et al., entitled "Capturing and Presenting Site Visitation Path Data," which is incorporated herein by reference.

In one embodiment, the system automatically designates certain nodes as checkpoints based on particular characteristics, location, name, popularity, or any other factor. For example, the home page, and/or the five most popular pages, can automatically be designated as checkpoints. These automatic, or default, checkpoints can, in one embodiment, be used to construct an initial target path.

It is within this context that the description of one embodiment present invention is described herein.

FIG. 1 is a flowchart illustrating a method of incrementally adding segmentation criteria to a data set according to one embodiment of the present invention.

As an optional preliminary step, user input is received 110 to select one or more defined reports for viewing. In one embodiment, the user initiates this step by clicking on a user interface control such as a reports button. In addition, a data set associated with the one or more defined reports is then received 120, for example comprising website visitation data. In one embodiment, this is accomplished by sending report queries to a network, and receiving report data from the network corresponding to the queries. The network replies, in one embodiment, with data. In this embodiment the retrieval includes interpreting the data, for example using hash codes or look up tables stored, e.g., in local cache. In another embodiment, the process begins at step 130.

The system displays 130 defined reports. In one embodiment, each report displays a set of default metrics, and the data are sorted by that metric. For example, an initial default metric may be visits to a website, although this can be customized by the user via an options screen. In one embodiment, the user can customize the default metrics on a per-report basis, for example by changing, adding, or deleting metrics. In one embodiment, the defined reports are displayed 130 in a report display area of a user interface.

In one embodiment, preprogrammed default metrics include Page Views; Visits; Hourly, Daily, Weekly, Monthly, Quarterly, or Yearly Unique Visitors; Revenue; Orders; Units; Cart Opens, Adds, Removes, and Views; Checkouts; Custom Events; Occurrences (the Product View, Campaign Click-thru, instance equivalents); and Participation Metrics.

Initially, the report shows a default number of data rows (such as 10), although the user can adjust the default number as desired. In various embodiments, the reports are standard, preset reports associated with a set of predefined filters; user-customized reports built during a current session; previously customized reports retrieved from storage; or fall-out reports.

A "fall-out report" is a report based, in one embodiment, on a target path specified in terms of checkpoints as described herein. A fall-out report indicates how many visitors continued to the next checkpoint in target path, regardless of whether the visitor/customer visited other, tangential pages before continuing. In one embodiment, the present invention provides a mechanism for generating and tailoring a "fall-out report" that provides statistics on visitation paths for specific checkpoint pages, without regard to other pages that are not designated as checkpoints. If the user chooses to apply one or more filters by clicking on elements of the report, the fall-out report is automatically updated accordingly. Thus, the user can easily specify the particular filter parameters for a fall-out report, and can easily modify, add, or remove such parameters as he or she sees fit.

In some embodiments, various views of the report data are available. For example, types of views include tended, improved, ranked, over time, fall-out, conversions, averages, graphical, Gantt, tabular, raw data, and flexible. Some reports also include a search field that allows the user to search for and view entries for specific keywords or phrases.

When a user desires to filter a report, the system receives 140 user input to adjust segmentation criteria to filter the report. In various embodiments, the adjustment to segmentation filter criteria includes adding segmentation criteria; removing pre-existing segmentation criteria; adjusting a date range; creating a new segmentation criterion; and activating a contextual menu of options for the segmentation criteria.

In one embodiment, the information in the rows of the report is mutually exclusive, such that selection of a single criterion or filter collapses the report to the selection. In another embodiment, the information is not mutually exclusive, thus selection of multiple rows, and thus multiple filters, is possible.

The user can filter a report by various means. For example, the user can click on a filter icon ("funnel") adjacent to the desired filter criterion. The icon acts as a toggle in one embodiment, switching between activating and deactivating the criterion depending on its current state.

In one embodiment, clicking on a funnel icon causes the filter to be applied as an "AND" logical operation. In one embodiment, the user can use various operations to apply a filter as an "OR" criterion. For example, the user can, in one embodiment, shift-click to apply the filter as an "OR" criterion. Thus, the system can receive user input to apply more than one filter to a single defined report, using either an AND or an OR logical operation for combing the filters, in response to receiving input to apply two or more filters in series. All reports will adjust according to the filters. The user can then further filter the adjusted reports, if desired. In one embodiment, the user can right-click to see a menu of options for applying the filter.

According to one embodiment, elements of the displayed reports are themselves user input elements for specifying filters. Thus, the user can click on an area (such as a line) within a tabular report to apply a filter that corresponds to the data item being displayed in that area. In one embodiment the applied filters are shown in a segment filter area of a user interface, which displays a summary of the filters and the method by which they are combined (e.g., AND or OR).

Next, the system processes 150a the selected criteria, displaying 150b one or more adjusted reports. In one embodiment, each report is adjusted according to the segmentation criteria. In one embodiment, the adjusted reports are displayed virtually instantaneously following the user input to adjust the segmentation criteria. In addition, if the reports have been adjusted by more than one filter, all filters will be reflected in the displayed adjusted reports, e.g., in a report display area of a user interface. In one embodiment, sampling rate for reports is selected based on requested date range, available RAM and other technological considerations. In one embodiment, the processing 150a is part of an executable process that combines filters and applies them to the reports. An executable process also displays a summary of the filter criteria in a segment filter area of a user interface and adds filter criteria to the summary as filters are selected according to one embodiment.

As part of this process that system also may store the reports. A user can save and later re-open a project. When a user saves a project, the data set, filters, reports, and canvas appearance are all preserved. Subsequently, when the user opens the saved project, everything looks exactly as he or she left it.

One skilled in the art will recognize that the present invention can be used in connection with any type of filtering criteria that can be specified by the user, and/or with any combination of such filtering criteria. Examples include the ordinal visit number (indicating whether this is the visitor's first visit, second visit, etc.), which particular pages were visited, time of day of the visit, geographic location of the visitor, web browser being used, whether or not the visitor is using a beta version of the browser, and the like.

Figure 2A:
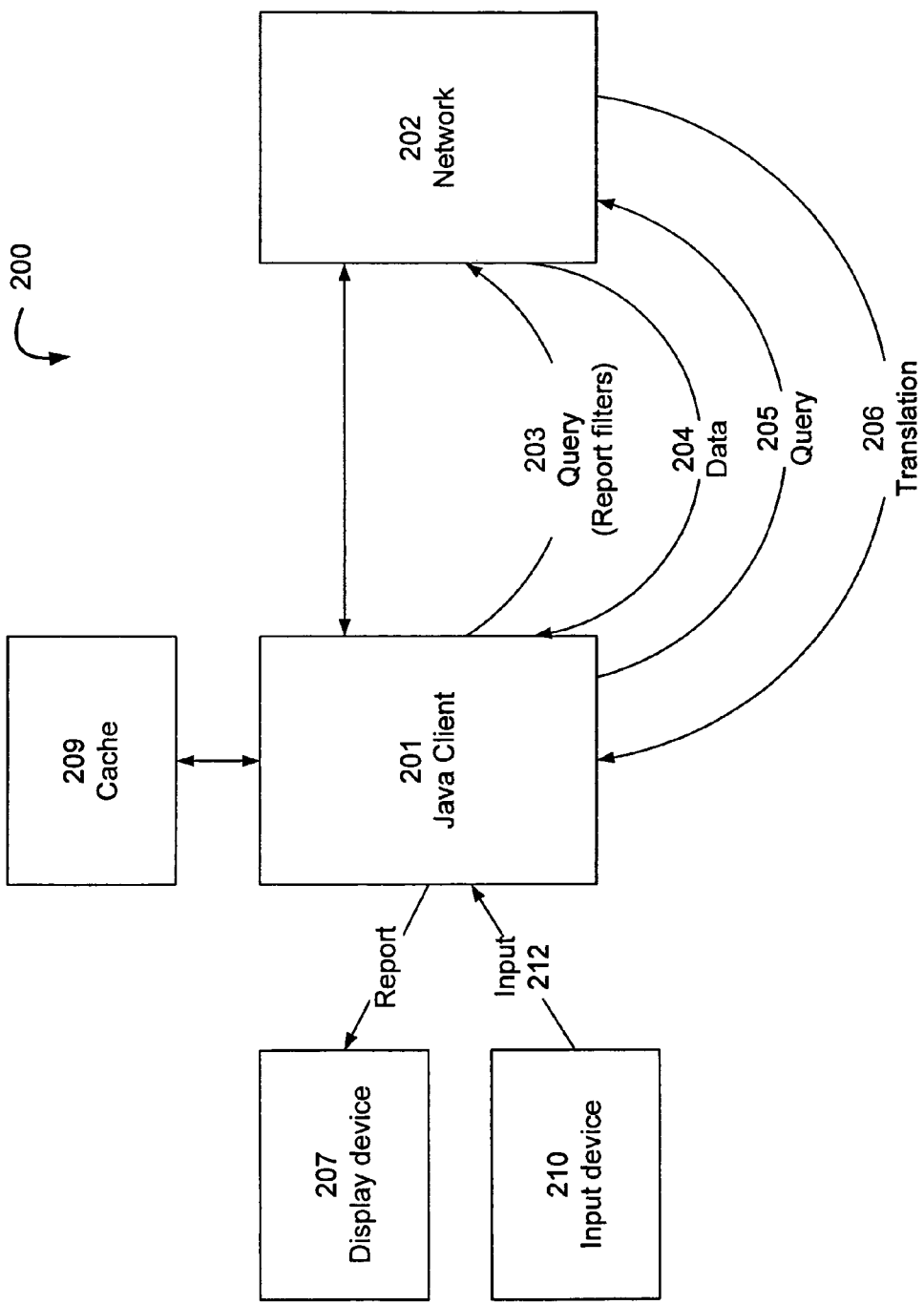
FIG. 2A is a block diagram illustrating a system useful for incrementally adding segmentation criteria to a data set according to one embodiment of the present invention.

Referring now to FIG. 2A, there is shown an example of a system 200 useful for practicing the present invention according to one embodiment. One skilled in the art will recognize that the invention can be practiced using other embodiments that differ from the examples shown.

The system 200 includes a client 201, a network 202, and optionally a cache 209, for incrementally adding segmentation criteria to a data set. The client 201 includes software including of a number of executable code portions and data files. These include code for viewing and interacting with website usage reports according to one embodiment of the present invention, as well as for supporting functionality of a user interface, as will be described in greater detail in conjunction with FIG. 2C.

Client 201 is responsible for orchestrating the processes performed according to the methods of the present invention. For example, client 201 receives input 212 from an input device, and sends reports to display 207 (or other output device) for output to the user. Client 201 runs on a standard personal computer.

Figure 2B:
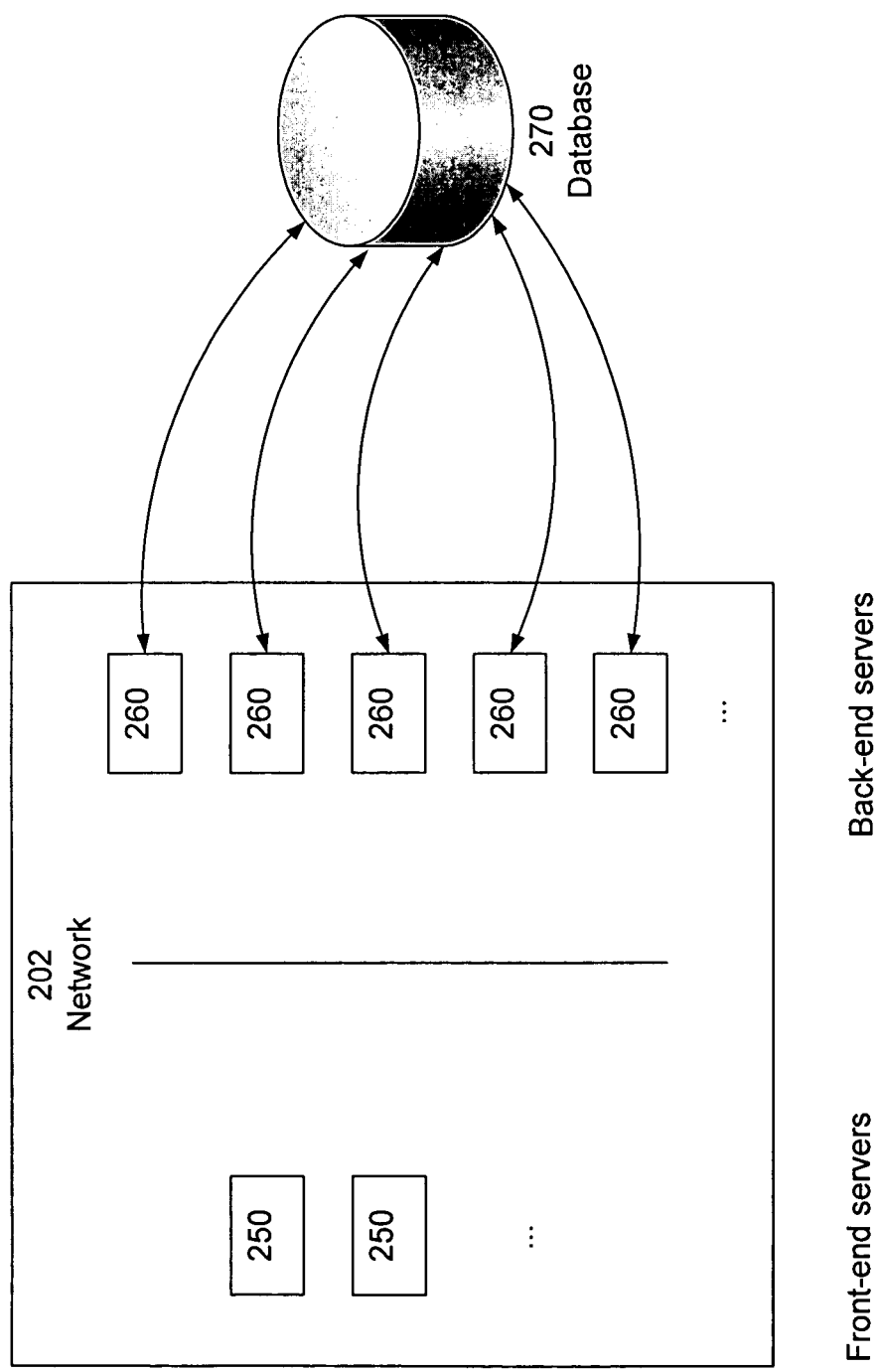
FIG. 2B is a block diagram illustrating an architecture for a network according to one embodiment of the present invention.

Network 202 is a centralized network for handling and responding to client requests for data on website usage, as described further in conjunction with FIG. 2B.

A cache 209, if present, is a standard cache of small, fast memory holding recently accessed data. The cache 209 may include, for example a list of hash codes or other look up tables for report data as described below.

In one embodiment, the components shown in FIG. 2A operate as follows. When a user requests one or more reports via an input device 210, client 201 receives input 212 to this effect. Client 201 sends a query 203 to network 202, specifying which reports are requested, and optionally specifying one or more filters for the reports. In one embodiment, query 203 is in XML format.

In response to query 203, network 202 returns data 204 that contains a representation of the report data. Data, in various embodiments, may be coded or not, and may be hashed data or may be included in a standard look up table. For example, data 204 may specify, in hash coded terms, the text string name of an item in a report. The data 204 is received by client 201.

Client 201 stores, in local cache 209 in one embodiment, a list of previously received and decoded hash codes or look up table information, so that it can correctly interpret a hash code or table data that it has encountered previously. In one embodiment, local cache 209 is used and is cleared at the end of a session, so that only those codes previously received in the same session are stored in cache 209. In other embodiments, local cache 209 is implemented in a more persistent or less persistent fashion, depending on user needs.

Upon receiving data 204, client 201 consults cache 209 if present; if cache 209 contains the hash code(s) or meaning(s) of data 204 (in other words, if client 201 has previously received data containing the same hash code/meaning), client 201 can interpret the meaning of the hash-coded or look up tabled data without any further communication with network 202. For example, a hash code/meaning may specify that hash term #299 signifies a visitor using Internet Explorer 6.0. If hash code(s)/meaning(s) from data 204 is/are not present in cache 209, client 201 sends a query 205 to network 202; network 202 responds by sending translation 206 to client 201. Translation 206 provides client 201 with the meaning of terms. In one embodiment, client 201 stores this meaning in cache 209 for future use.

Once client 201 has received sufficient data to generate a report, it sends report to display 207 for output to the user. In one embodiment, if some meanings have not yet been received, client 201 still sends report, and report states that certain terms are unknown. In another embodiment, client 201 displays an error message and/or waits until more complete meaning data is available.

The user can interact with the displayed report via user input device 210 such as a mouse, keyboard, or the like. The user can click on areas within report; when the user clicks on an area that can be interpreted as a filter, client 201 generates and sends a new query 203 containing the new report filter criteria. The above process then repeats, and an updated report is sent to display 207.

Referring now to FIG. 2B, there is shown an example of an architecture for network 202 according to one embodiment. Network 202 includes any number of front-end web servers 250 that receive queries 203, 205 from client 201, and any number of back-end servers 260 that obtain data from storage, e.g., from database 270, analyze the obtained data, and send report data back to client 201. Servers 250, 260 are computers or devices that send and receive information using well known network protocols, such as TCP/IP and HTTP, for communication across a network. Back-end servers 260 send an appropriate data set to client 201 based on the filter request. For example, if a filter request specifies that the user is only interested in visitors that used a particular web browser, back-end servers 260 remove the data that does not match the specified criterion, and only forward to client 201 the data that does match.

Database 270 may be a relational database or any other type of database that stores the data used by client 201. Database 270 may be accessible by client 201 through a user interface, e.g., as described in conjunction with FIGS. 3A-3G.

Database 270 contains website visitation data, which in one embodiment is stored in a binary format stored in some storage medium such as a hard drive. In one embodiment, the website visitation data is broken up into files, or "bricks," to facilitate extraction of portions of the data. When servers 260 extract data from database 270, they are provided with specific bricks that match the criteria.

In one embodiment, when the user requests a report showing website visitation data for a specified time period, back-end servers 260 extract data from database 270 that contains web visitation logs and/or statistics. In one embodiment, servers 260 obtain data from database 270 that represents a snapshot of website visitation over a specified time period. Servers 260 then store this website visitation data in temporary local storage (such as random access memory), using for example a binary format that is encoded according to an algorithm so as to minimize bandwidth usage. In one embodiment, this binary format is identical to the format used in database 270, so that no file format translation need be performed when servers 260 extract data from database 270. Servers 260 and then apply filters as requested, and send the filtered data to client 201.

In one embodiment, whenever the user requests a broader date range for website visitation data, back-end servers 260 perform a new data extraction from database 270. However, when the user narrows the date range from a previously specified range, no new data extraction is performed; rather back-end servers 260 filter the previously extracted data according to the new filter parameters.

Figure 2C:
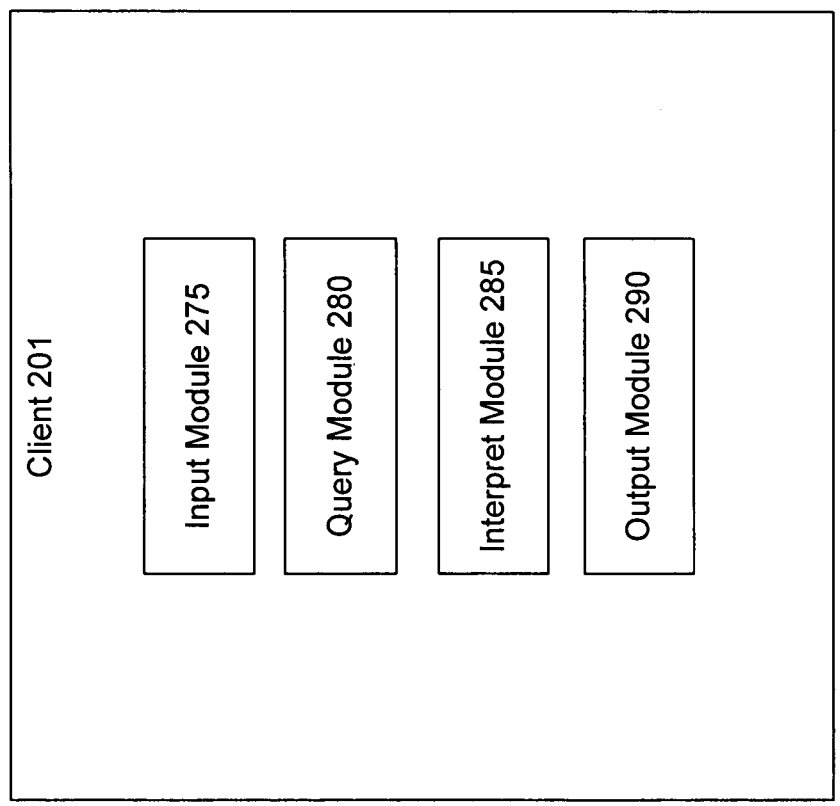
FIG. 2C is a block diagram illustrating software modules used by a client according to one embodiment of the present invention.

FIG. 2C is a block diagram illustrating software modules used by a client according to one embodiment of the present invention. The modules include of a number of executable code portions and data files. These include code for creating and supporting a user interface according to one embodiment of the present invention, as well as for supporting incrementally adding segmentation criteria to a data set. The modules include an input module 275, a query module 280, an interpret module 285, and an output module 290.

The input module 275 is configured for receiving input to select one or more reports; receiving input to adjust segmentation criteria for one or more reports; receiving input to adjust one or more metrics; and receiving input for adjusting various aspects of displayed data. Thus, when a user requests one or more reports via an input device, the input module allows the client to receive input to this effect. In one embodiment, the input module 275 is further configured to receive user input to apply more than one filter to one or more reports, e.g., using logical operators.

The query module 280 is configured for retrieving a data set comprising website visitation data associated with one or more reports; sending report queries to a network and receiving report data from the network corresponding to the queries; storing adjusted reports as one of the one or more defined reports. In one embodiment, when user input is received to filter the reports, a new query is generated and sent, repeating the process.

The interpret module 285 is configured for, in response to receiving data from the network, interpreting the data. In one embodiment, the interpret module 285 uses hash codes/meanings stored for this purpose. If hash codes/meanings are not present, for example in local cache, in one embodiment the interpret module 285 sends a query to the network, and receives back translation, providing the meaning of term.

The output module 290 is configured for processing and displaying one or more defined reports; displaying one or more (singly or multiply) adjusted reports, each adjusted according to segmentation criteria; displaying one or more twice-adjusted reports, each adjusted according to the segmentation criteria. In one embodiment, the processing takes place as described in conjunction with FIG. 1. In one embodiment, the output module 290 sends reports to a display device for output to the user. In one embodiment, the output module 290 is further configured to display the reports in a report display area of a user interface. If the information in the rows of the report is mutually exclusive, the selection of a single criterion or filter collapses the report in the user interface to the selection according to one embodiment. In one embodiment, the output module 290 is further configured for displaying the applied filters in a segment filter area of a user interface.

The above software portions 275-290 need not be discrete software modules. The software configuration shown is meant only by way of example; other configurations are contemplated by and within the scope of the present invention.

User Interface

Figure 3A:
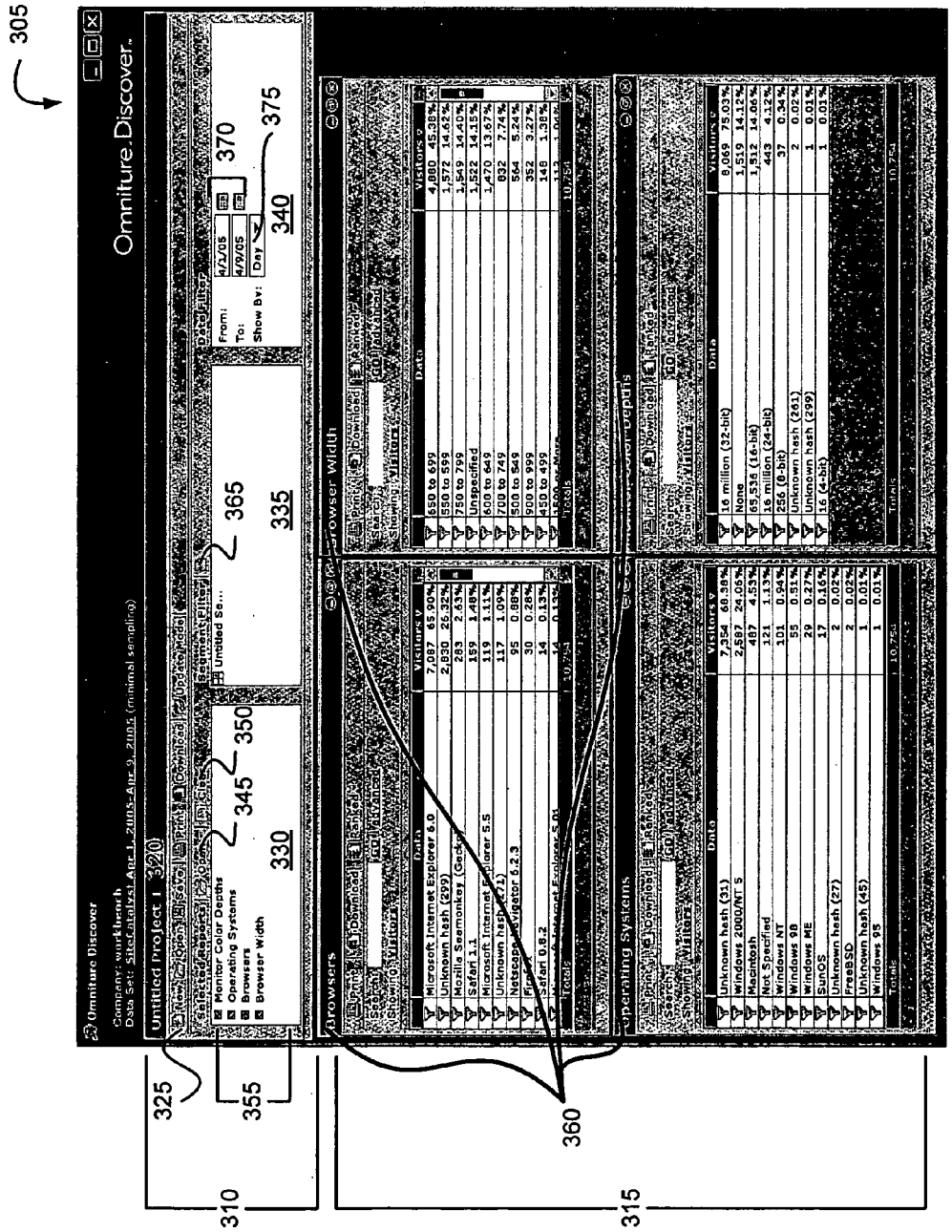
FIGS. 3A and 3C-3D illustrate a user interface for incrementally adding segmentation criteria to a data set according to one embodiment of the present invention.

FIG. 3A illustrates a user interface 305 for incrementally adding segmentation criteria to a data set according to one embodiment of the present invention. In one embodiment, the user interface is implemented using a known environment such as Macromedia Flex, Java, DHTML, or any combination thereof.

The user interface 305 includes two main functional areas, a report control area 310 and a report display area 315. The report control area 310 includes functionality for creating projects and reports and for displaying report statistics. The report display area 315 includes functionality for displaying and filtering reports.

The report control area 310 further includes a project title 320, a project toolbar 325, a report selection area 330, a segment filter area 335, and a date filter area 340 according to one embodiment. The project title 320 displays the title of the project in use, and in one embodiment defaults to "Untitled Project 1" when no title has been selected, as illustrated in FIG. 3A. The project toolbar 325 is a standard toolbar, and includes icons for various project functionalities such as creating a new project, opening an existing project, saving the project in use, printing the project, etc. The report selection area 330 includes an open report button 345, a list of selected reports 355, and a clear button 350. The open report button 345 allows the user to open an existing report. Once opened, the report name is added to the list of selected reports 355, and the report 360 is displayed in the report display area 315. Each of the selected reports 360 in the list of selected reports 355 is displayed in the report display area 315. Report data is retrieved, e.g., by the process described in conjunction with FIGS. 2A-2B.

Figure 3B:
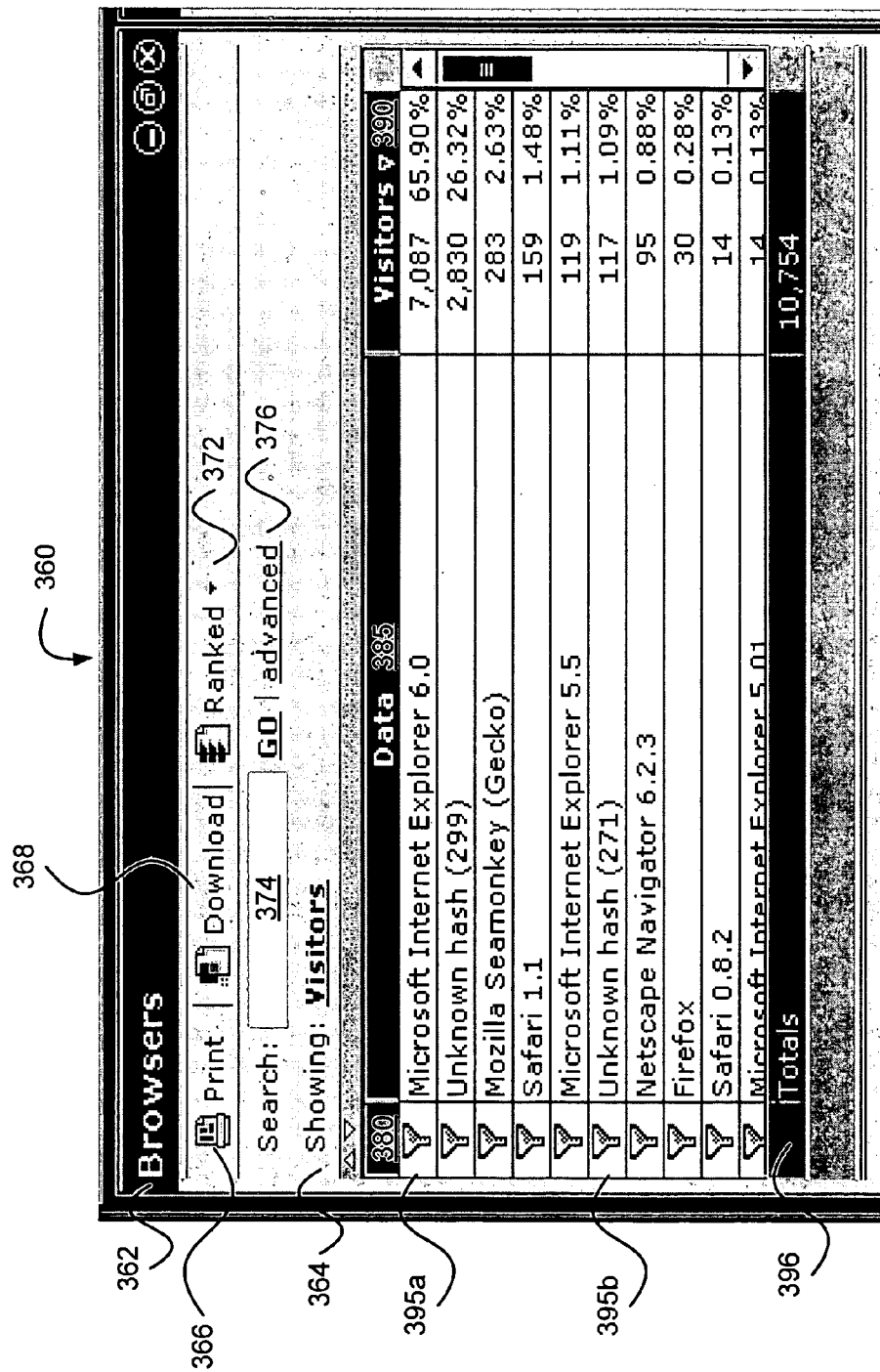
FIG. 3B illustrates a report of the user interface of FIG. 3A according to one embodiment of the present invention.
Figure 3C:
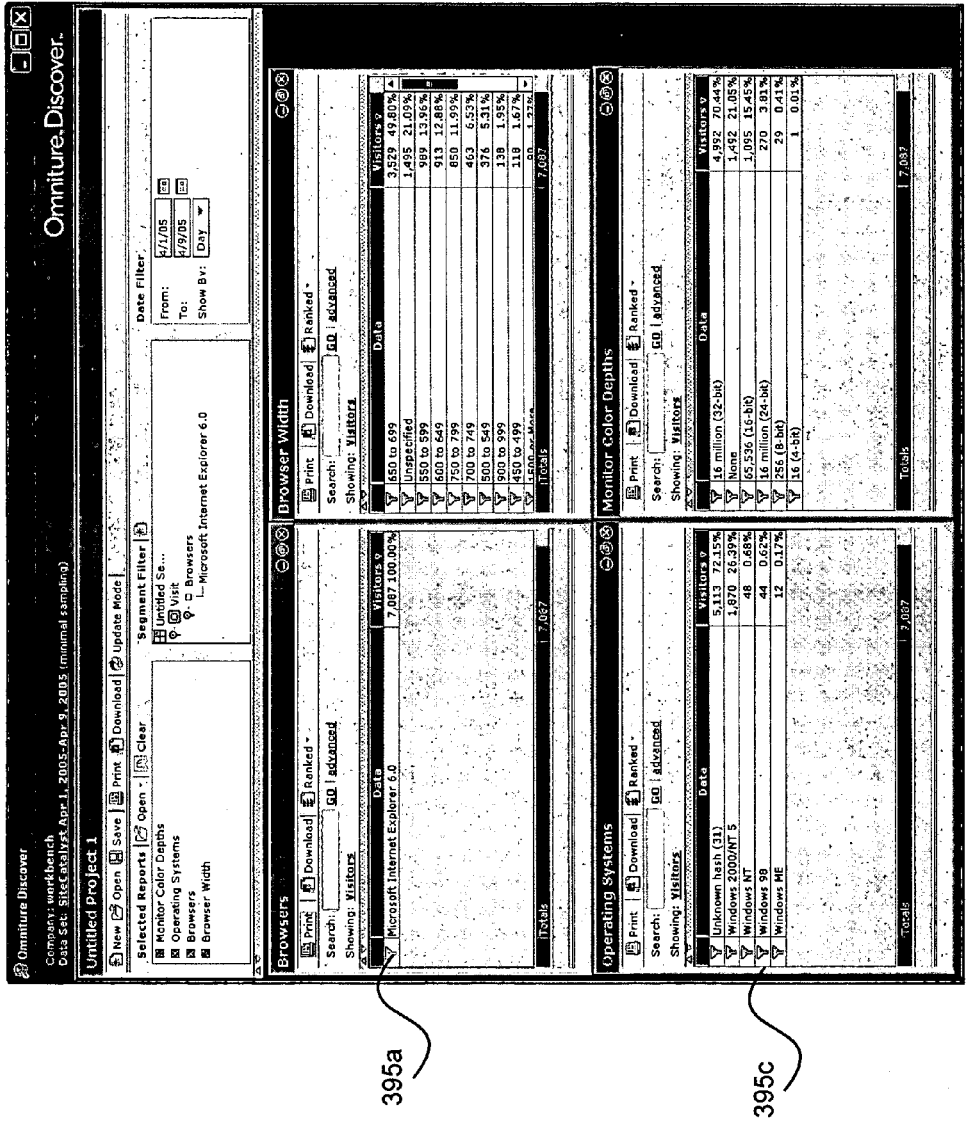

The segment filter area 335 displays a list of selected segmentation criteria, as shown in FIG. 3C. The segmentation filter area 335 also includes a new segment button 365 for manually adding segmentation criteria.

The date filter area 340 allows the user to filter the selected reports 360 by date, for example by selecting a date range for which the user would like to see the report 360 data. The date filter area 340 includes to and from date selectors 370 and a show by selector 375. The two and from data selectors 370 allow the user to set start and end dates for the data displayed in the report 360, either by typing in the desired dates or by clicking the calendar icon and selecting the dates on a calendar. The show by selector 375 allows the user to select the granularity of the report, for example, by day, week, or month.

Figure 3D:
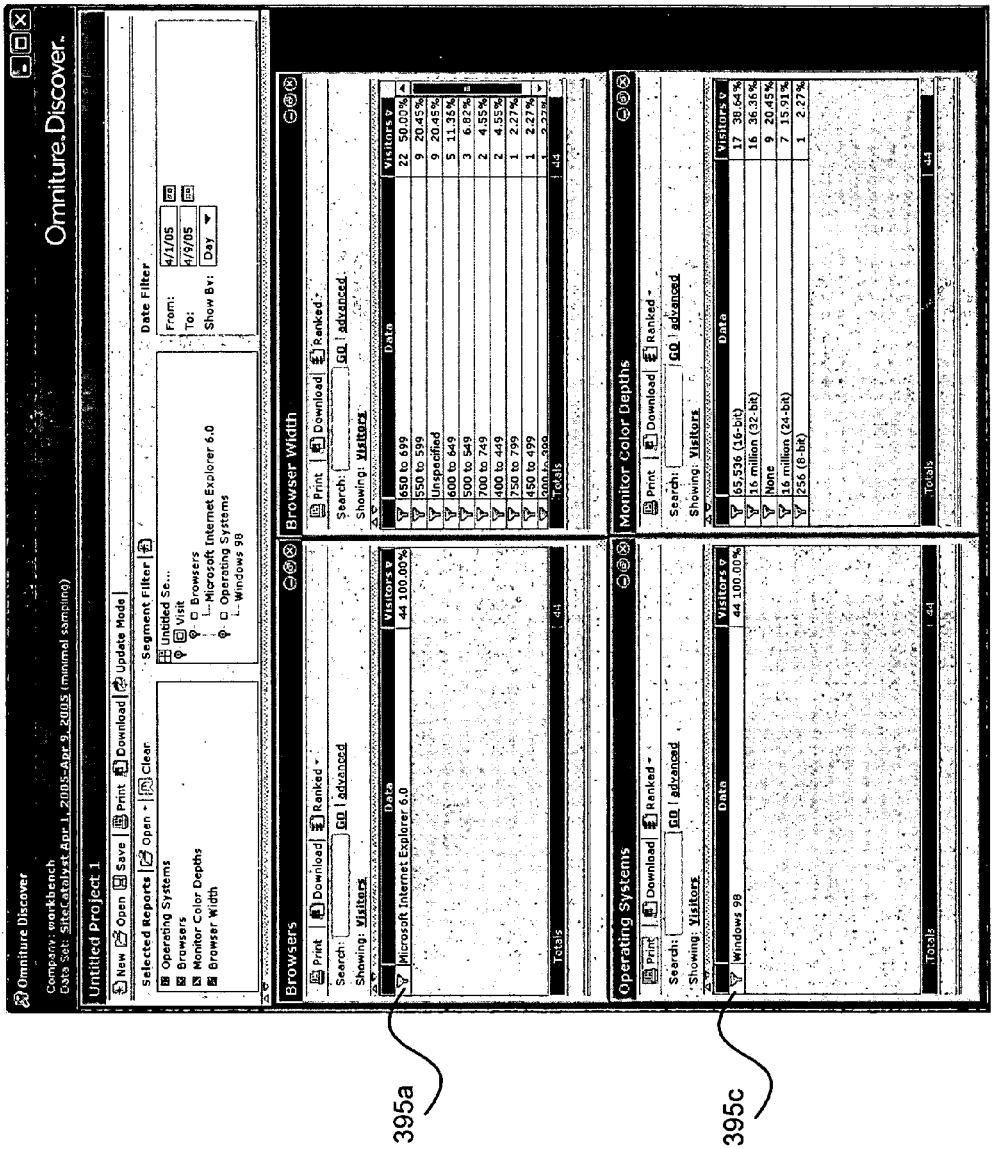
Figure 3E:
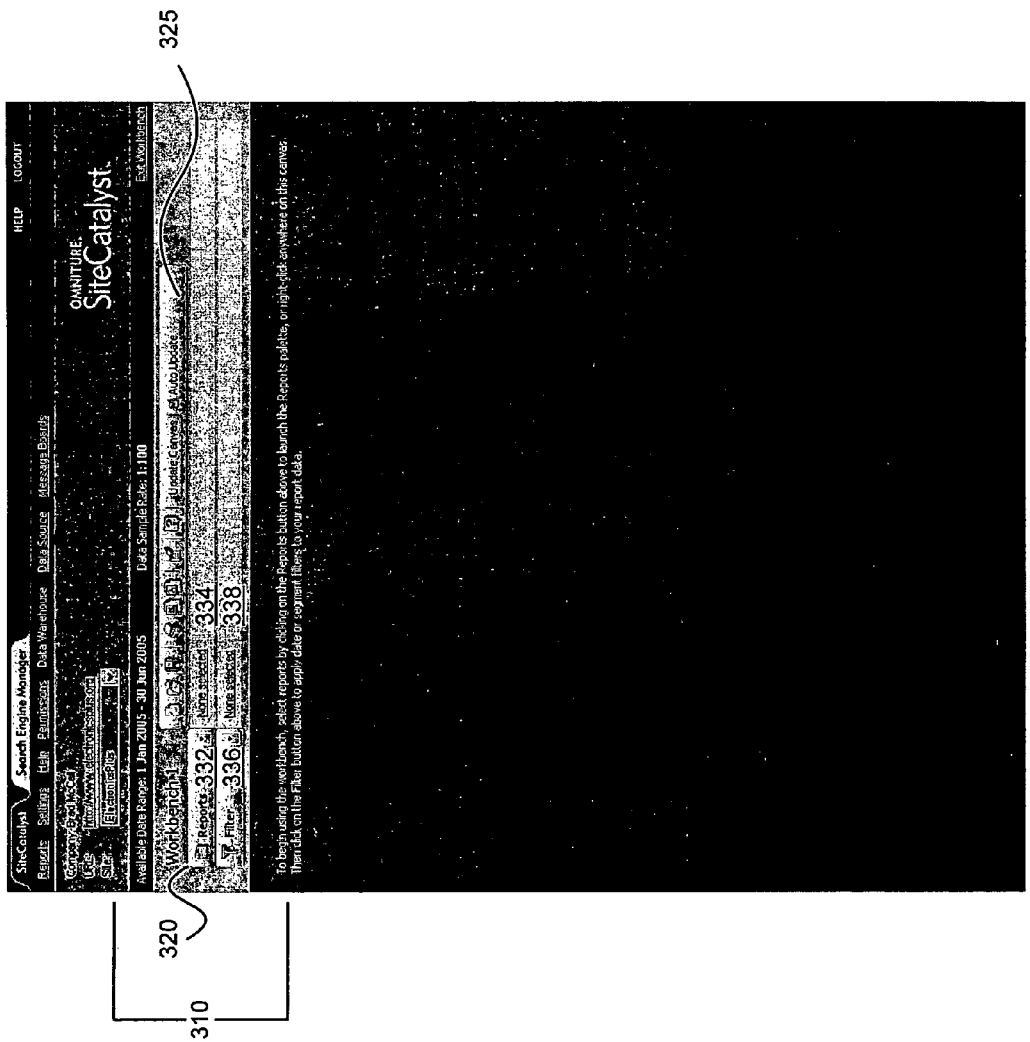
FIG. 3E shows a user interface illustrating another embodiment of a user interface for incrementally adding segmentation criteria to a data set according to the present invention.
Figure 3F:
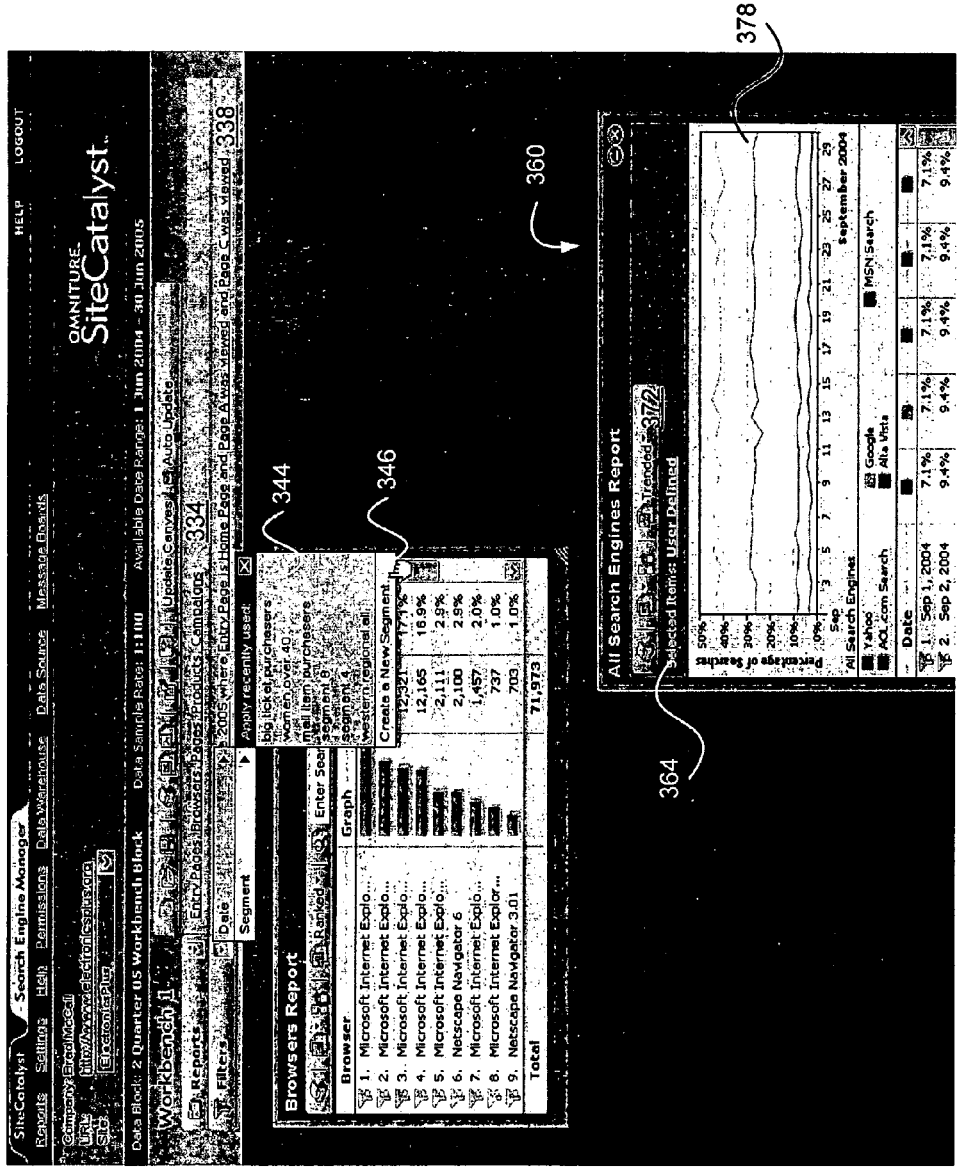
FIG. 3F shows an open segment filter window of the user interface of FIG. 3E according to one embodiment of the present invention.
Figure 3G:
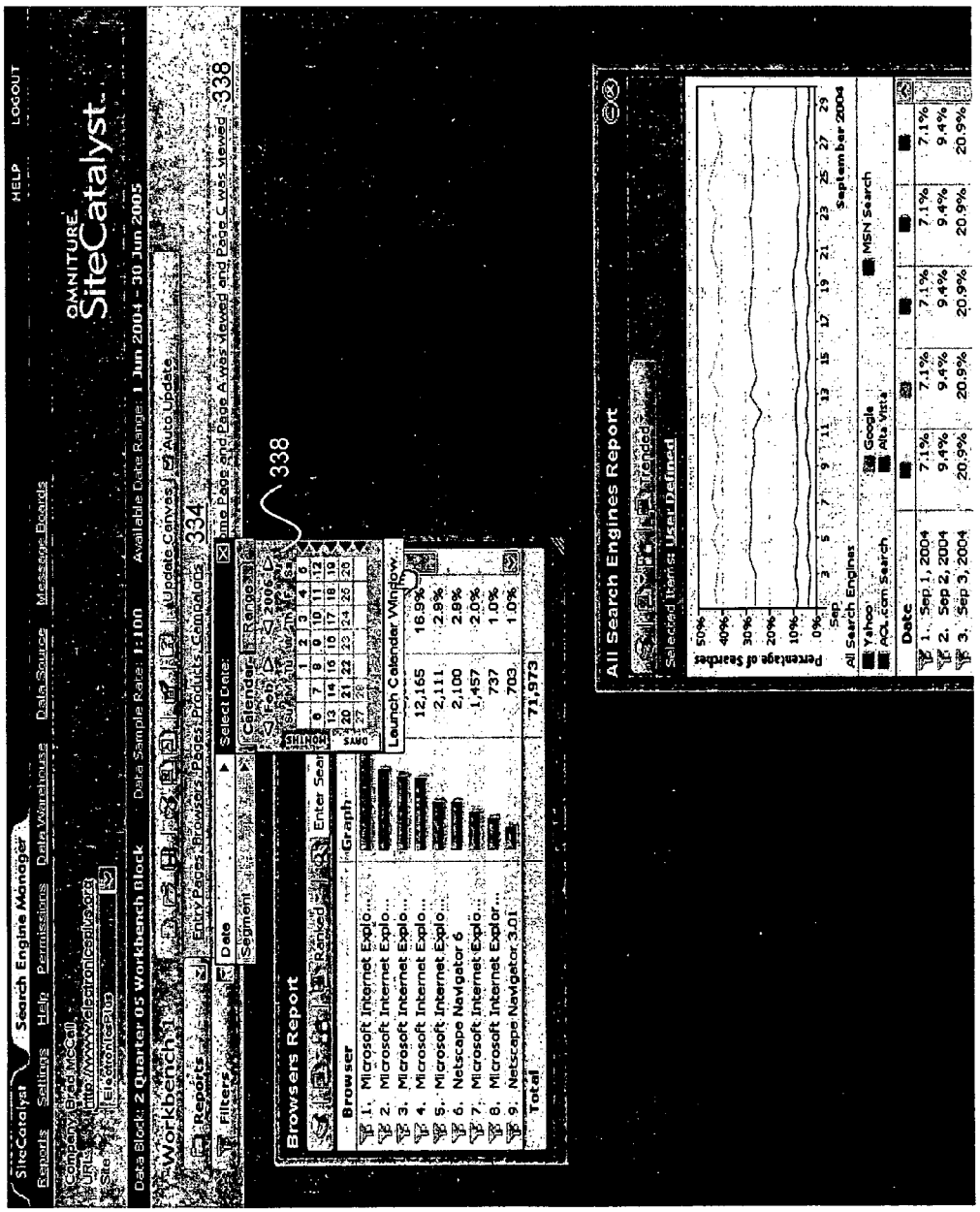
FIG. 3G shows an open date filter window of the user interface of FIG. 3E according to one embodiment of the present invention.

FIG. 3E shows a user interface with another embodiment of a report control area 310. The report control area 310 includes a title 320 and toolbar 325 similar to those described in conjunction with FIG. 3A. However, this embodiment includes different user interface elements for selecting reports and filtering criteria. The report control area 310 includes a reports button 332 that operates to allow the user to select reports for viewing, similar to the functionality of open button 345. Once a report 360 is open, it is displayed in a report display list 334. The report display list 334 of FIG. 3E shows that no report has been selected. See FIGS. 3F-3G for other examples of report display lists 334. The report control area 310 also includes a filter button 336 that allows the user to select segment and date filter criteria. Clicking on the filter button 336 activates a drop-down that allows the user to choose date or segment filters, as shown in FIG. 3F-3G.

Once a filter is chosen, a textual description of the filter displays in the filter list 338. The filter list 338 of FIG. 3E shows that no filters have been selected. See FIGS. 3F-3G for other examples of filter lists 338.

The report display area 315 includes the reports 360 chosen in the reports selection area 330. FIG. 3B illustrates a report 360 in greater detail according to one embodiment of the present invention. Each report 360 displays data corresponding to one dimension within the context of a larger data set, for example, website visitation data. The report name 362 is the dimension that the selected report 360 displays. For each report 360, data is sorted according to one or more default metrics 364. In this example, the default metric 364 is visitors (to the website). In another embodiment, the metric(s) used can be user defined, as shown in the metric selector 364 of FIG. 3F.

Reports 360 also include a set of standard function keys, including a print button 366, a download button 368, and view selector 372. The print button 366 allows the user to print online reports without having to first download the reports. Clicking the print button opens a pop-up window with a printer-friendly version of the report.

The download button 368 allows the user to select the format in which to download the report (e.g., Word, Excel, PDF, HTML). Once the user selects a format, the report is sent to the user as an email attachment or is downloaded directly to the user's computer.

The view selector 372 allows the user to select various views of the report data. The Ranked view, shown in FIG. 3B, is the default view for most reports, allowing the user to view report data in tabular format according to the selected time periods. Other views include Improved, which allows the user to see how selected items performed between previous and current time periods based on success metrics such as revenue of checkouts, and Trended, which allows the user to view report trends over a given time. The user may select other available views using the view selector 372 drop-down. A Trended view 378 is shown in FIG. 3F; the view selector 372 displays Trended.

In addition, some reports 360 include a search field 374. A search field 374 allows the user to search for and view entries for specific keywords or phrases. As a result of clicking "go," the report displayed will be filtered by the entered search term. In addition an advanced search button 376 allows the user to search with greater specificity, for example, by choosing whether to search for the exact phrase, perform an "and" or "or" search using the search terms, or exclude entries with the entered search terms. In one embodiment, clicking the advanced search button 376 opens a pop-up window displaying these options.

Each report 360 is divided into columns, including a filter column 380, a data column 385, and one or more metric columns 390. The data column 385 includes a list of various forms of the dimension corresponding to the report 360. In the depicted example, the dimension is Browsers, thus various browsers, such as Microsoft Internet Explorer 6.0, Netscape Navigator 6.2.3, etc., are listed. The metric column(s) 390 includes statistics for the respective row's 395 data column 385. In the example depicted, for each browser (data column 385), the metric column 390 displays visitors by number and percentage of the whole.

The filter column 380 of each row 395 includes an icon that allows the user to filter the data by that row 395. All reports 360 are filtered to reflect the filter. In one embodiment, the filter column 380 icon acts as a toggle, narrowing or expanding the data depending on the present state of the data. Data may be further filtered if desired, and again all reports 360 are filtered by the additional criterion. In one embodiment, filtering occurs virtually instantaneously. In addition, the rows are totaled in a totals row 396.

Reports 360 display rows up to a pre-selected number for the user interface 305. In one embodiment, the number of rows can be edited. The user can interact with on-screen report windows according to well known interaction techniques for window-based operating systems. For example, the user can drag edges to change the height and width;

minimize, delete, and maximize; reposition/rearrange windows on the canvas by dragging the window title bar; and drag the column margins to resize column width.

Figure 4A:
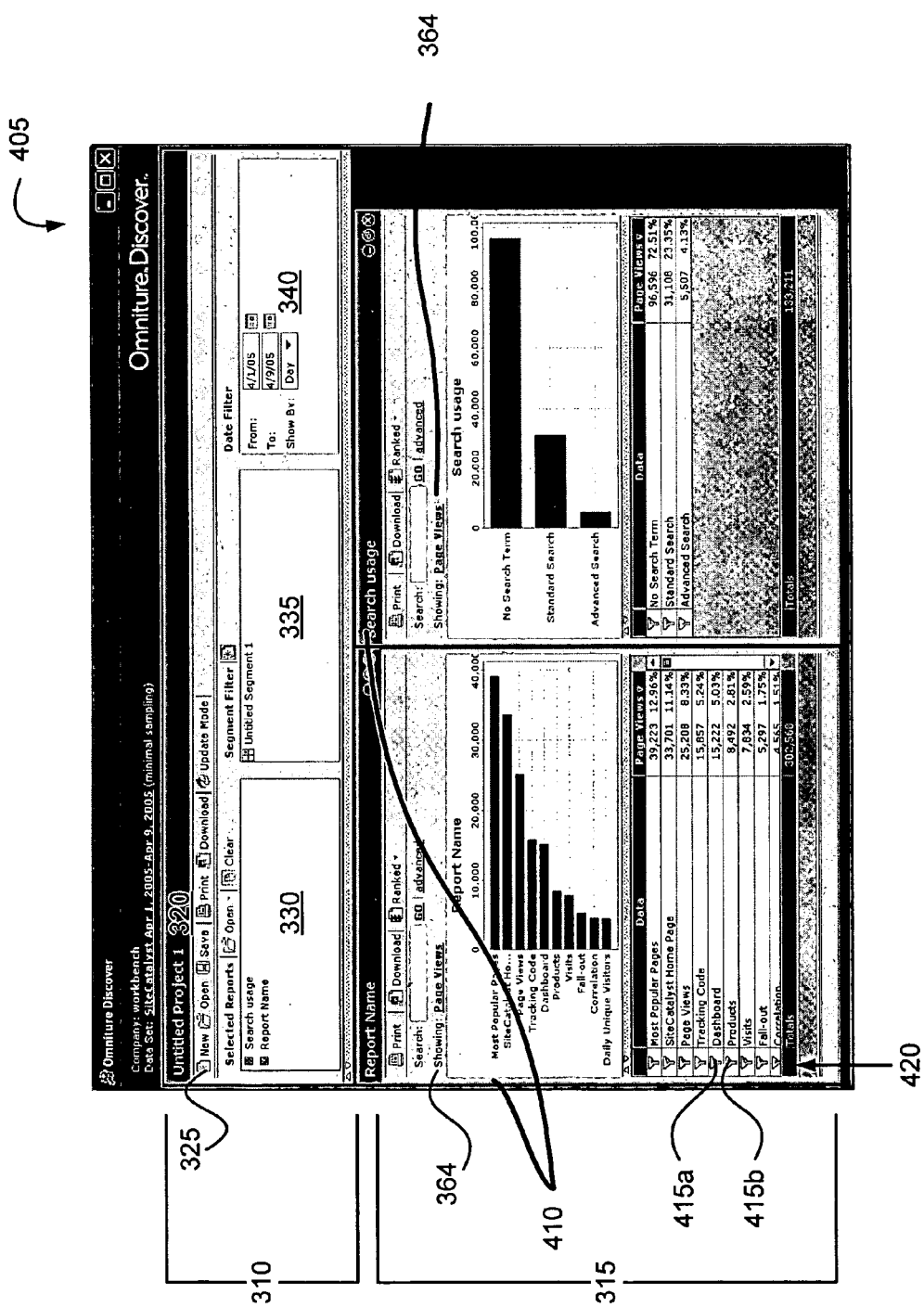
FIG. 4A illustrates a user interface for filtering website visitation data according to one embodiment of the present invention.

FIG. 4A illustrates a user interface 405 for filtering website visitation data according to one embodiment of the present invention. The user interface 405 is similar to the user interface described in FIGS. 3A-C. The user interface 405 includes a report control area 310 and a report display area 315, which function as described above. In the embodiment displayed, a date range of Apr. 1 through Apr. 9, 2005 has been selected in the date filter area 340.

The report display area 315 includes various reports 410. FIG. 4A shows two unfiltered reports 410. Each of the displayed reports 410 is shown in the report selection area 330. In this example, the default metric 364 for the displayed reports 410 is Page Views. Report data for the reports 410 is retrieved, e.g., by the process described in conjunction with FIGS. 2A-2B. Because no filters have been applied, the segment filter area 335 does not display any segmentation criteria.

Each report 410 is divided into columns and rows 415, as described in conjunction with FIG. 3B. The filter column 420 of each row 415 includes an icon that allows the user to filter the data by that row 415. As one or more rows 415 are selected as filters, for example filter criterion rows Dashboard 415a and Products 415b, each report 410 updates to reflect the filters.

Figure 4B:
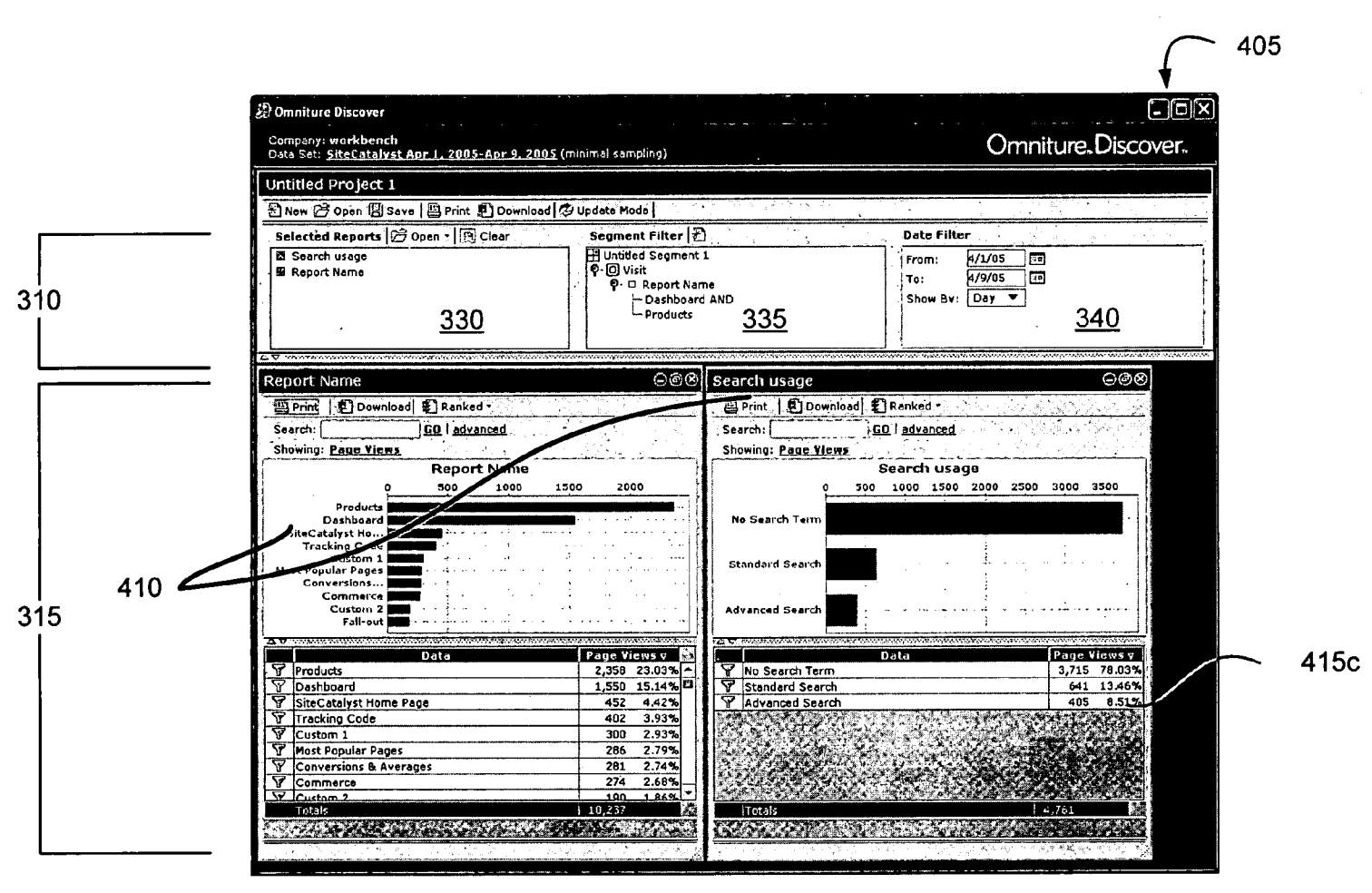

FIG. 4B illustrates the user interface 405 of FIG. 4A with two filters applied via an AND combination. Thus, FIG. 4B displays the user interface 405 showing results for visitors who viewed both the Products report and the dashboard. In one embodiment, the user may select an AND combination by clicking on filter icons corresponding to various filtering criteria in series. Because visitors may have accessed other reports 410 in addition to the reports 410 selected for filtering, the remainder of the report data is updated accordingly. Note that both reports 410 reflect application of these filters. Once the filter(s) are chosen, a textual description of the filter(s) displays in the segment filter area 335, including information about the combination type, e.g., AND operation.

Figure 4C:
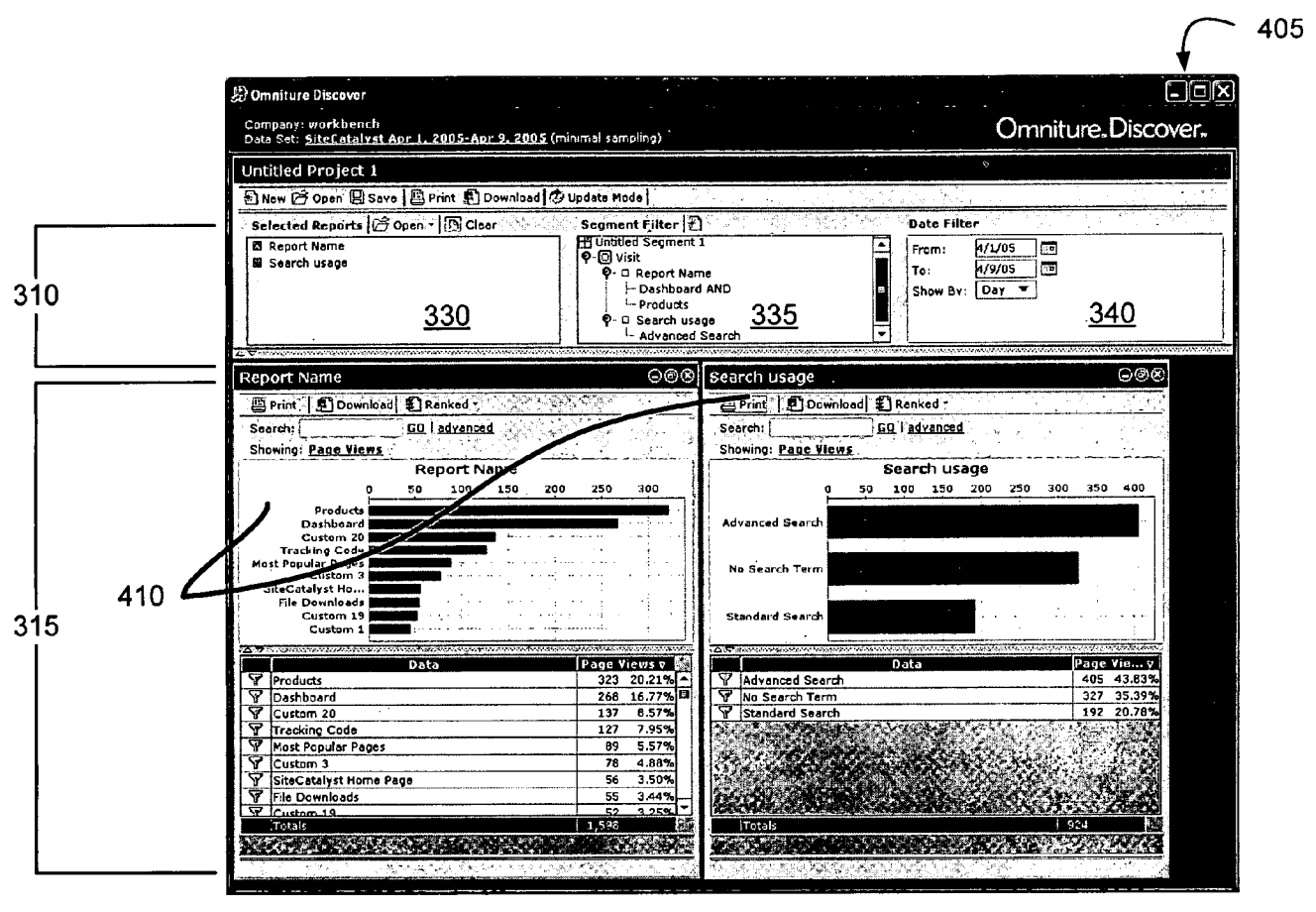

The user also may combine filters from different reports 410. For example, by selecting the filter icon of row 415c of FIG. 4B, advanced search is added as a filter criterion. FIG. 4C illustrates the user interface 405 of FIG. 4B with an additional filter applied via an AND combination. Thus, FIG. 4C displays the user interface 405 showing results for visitors who looked at the products report AND the Dashboard, AND performed an Advanced search. Again both reports 410 reflect application of the additional filter and the segment filter area 335 is updated.

Figure 4D:
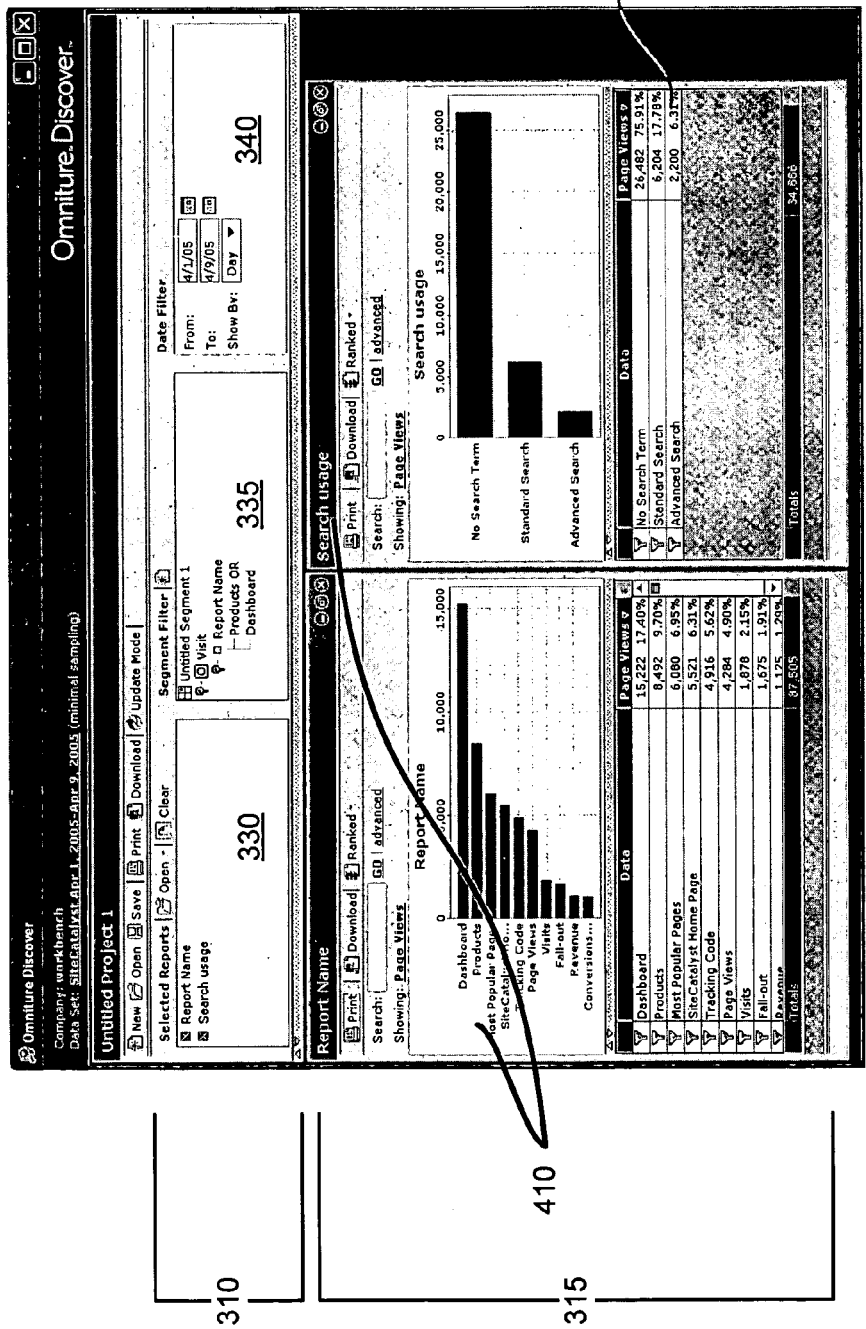
FIG. 4D illustrates the user interface of FIG. 4A with two filters applied via an OR combination.

FIG. 4D illustrates the user interface 405 of FIG. 4A with two filters applied via an OR combination. Specifically, filter criterion rows Dashboard 415a and Products 415b have been selected. Thus, FIG. 4D displays the user interface 405 showing results for visitors who viewed either the Products report OR the dashboard. In one embodiment, the user may select an OR combination by clicking on a first filter icon, and then clicking on a second filter icon while holding a keyboard key, e.g., the shift key. As described above, the remainder of the report data is displayed reflecting this update and the segment filter area 335 is updated accordingly. Both reports 410 reflect application of these filters.

Figure 4E:
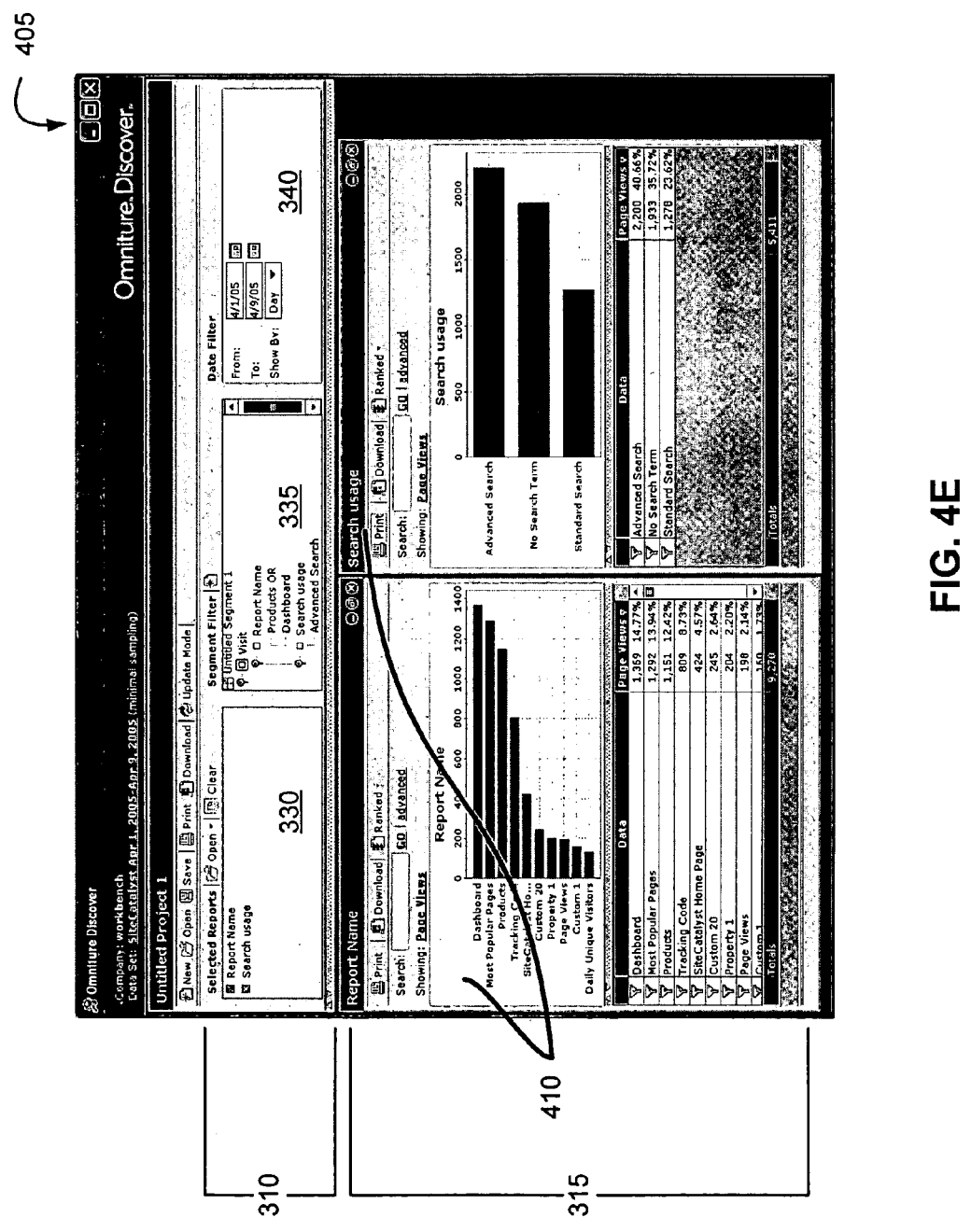

FIG. 4E illustrates the user interface 405 of FIG. 4D with an additional filter applied via an AND combination. For example, by selecting the filter icon of row 415c of FIG. 4D, advanced search is added as a filter criterion. Thus, FIG. 4E displays the user interface 405 showing results for visitors who looked at either the products report OR the Dashboard, AND performed an Advanced search. Again both reports 410 reflect application of the additional filter and the segment filter area 335 is updated.

As described in conjunction with FIGS. 3A-E, the user can interact with on-screen report windows according to well known interaction techniques for window-based operating systems.

Figure 5A:
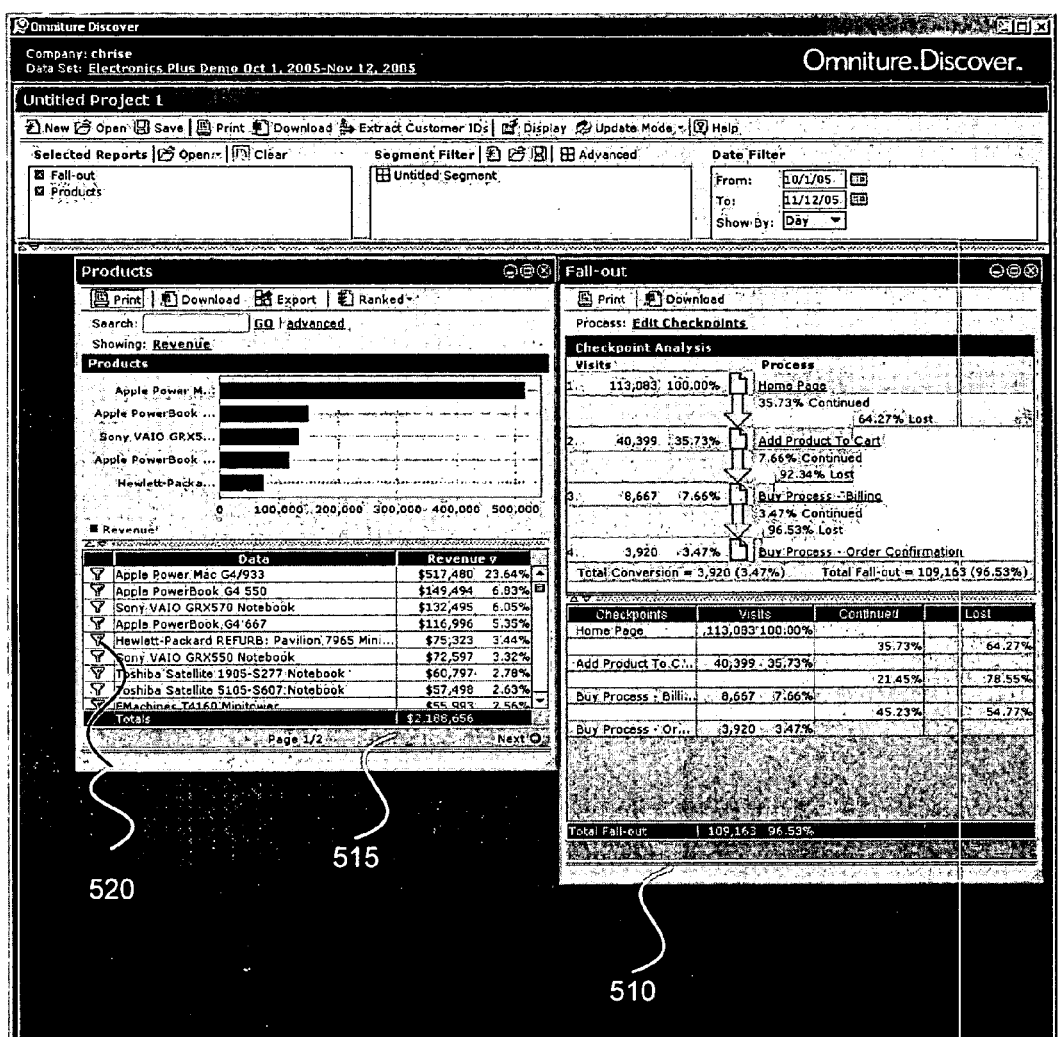
FIGS. 5A-B illustrate a user interface for incrementally adding segmentation criteria to a data set according to another embodiment of the present invention.

FIG. 5A illustrates a user interface 505 for incrementally adding segmentation criteria to a data set according to one embodiment of the present invention. The user interface 505 is similar to that described in conjunction with FIG. 3A, however, a fall-out report 510 is one of the displayed reports. A fall-out report 510 is based, in one embodiment, on a target path specified in terms of checkpoints as defined herein. Greater detail regarding the use of checkpoints, defining checkpoints, and detailed information about fall-out reports can be found in co-pending U.S. patent application Ser. No. 10/609,008, filed Jun. 27, 2003 by Brett Error et al., entitled "Capturing and Presenting Site Visitation Path Data," which is incorporated herein by reference.

In the example, four pages have been designated as checkpoints: the homepage, the Add Product to Cart page, the Buy Process—Billing Page, and the Buy Process—Order Confirmation page. Fall-out report 510 indicates how many users continued to the next checkpoint in target path, regardless of whether the user visited other, tangential pages before continuing. Users that did not continue are denoted as "lost." Fall-out report 510 thus corresponds to a target path through the website. An edit checkpoints link 515 takes the user to a screen for editing the target path.

The fall-out report 510 indicates, for example, that of those users that visited the homepage, 37.73% continued to the Add Product to Cart page and 64.27% were lost. Of those that visited the Add Product to Cart page, 7.66% continued to the Buy Process—Billing page and 92.34% were lost. Similar information is displayed for the remaining checkpoints. Cumulative percentages are shown for each checkpoint as well; these indicate the percentage of users reaching that checkpoint, based on the total number of users that visited the homepage at the beginning of target path. The actual number of users that reached each checkpoint is also shown, adjacent to the percentage. The report also includes statistics for total conversion (the number of users that visited all of the checkpoint nodes in the target path) and total fall-out (the number of users that visited the homepage but did not complete the target path) in terms of numbers and percentages.

Displayed with the fall-out report 510 is a standard products report 515. The reports 510, 515 displayed in FIG. 5A are unfiltered.

Interface Workflow

The following is a description of interface functionality for adding segmentation criteria according to one embodiment of the present invention in the context of FIGS. 3A-3G.

The user begins by launching a report, for example using the open button 345 of FIG. 3A or the reports button 332 of FIG. 3E, or by right-clicking anywhere on the canvas. FIG. 3E shows a blank canvas and FIG. 3A shows a canvas with four reports 360. Initially, no filter is applied.

In one embodiment, a user can filter the report 360 by various means. For example, the user can click on an icon in the filter column 380 adjacent to the desired filter criterion. This icon can function as a toggle, so that when the filter is already added to the report, clicking on the icon causes it to be removed. In the report 360 shown in FIG. 3A, the user applies a filter on the term "browser" to only see visits from visitors using Internet Explorer 6.0. This is accomplished by clicking on the icon to the left of the data, i.e., by clicking on the filter column 380 of row 395a. All reports 360 then filter based on the criteria selected; thus the other three reports 360 are showing only data with browser I.E. 6.0 as shown in FIG. 3C. In another embodiment, the filter criteria are not mutually exclusive and the criteria can be combined, for example via an AND or an OR operation. As a result, the remainder of the report data remains displayed after being filtered. FIGS. 4A and 4B illustrate an example of this embodiment. The filter criterion rows Dashboard 415a and Products 415b of FIG. 4A are selected as AND criterion by the user, resulting in the interface 405 displayed in FIG. 4B, which shows these criterion as well as the remaining filtered data. FIGS. 4A and 4D illustrate another example. The filter criterion rows Dashboard 415a and Products 415b of FIG. 4A are selected as OR criterion by the user, resulting in the interface 405 displayed in FIG. 4D.

Next, in one embodiment, the user adds another filter to the interface 305 of FIG. 3C to see only visitors running the Windows 98 operating system. This is done by clicking on the filter icon adjacent to Windows 98, i.e. filter column 380 of row 395c of FIG. 3C. Then all four displayed reports 360, including the one that already had the filter applied, show only data for visitors running both Windows 98 and I.E. 6.0, as shown in FIG. 3D.

Another way to filter the reports 360 is shown in FIG. 3E-3G. The user can click on the filter button 336 to apply date or segment filters to report data. Clicking on the filter button 336 activates a drop-down that allows the user to choose date or segment filters, as shown in FIG. 3F-3G.

If the user filters by segment, in one embodiment an additional drop-down menu 344 displays with recently used segments, e.g., as shown in FIG. 3F. The menu 344 also includes an option to create a new segment 346. If the user filters by date, in one embodiment a calendar 338 displays, e.g., as shown in FIG. 3G. The calendar 338 allows the user to select standard date ranges, such as days, weeks, months, and quarters, as well as custom date ranges.

Similar functionality for filtering by date and by segment can be accomplished in the embodiment shown in FIGS. 3A-3D, using the segment filter 335 and date filter 340 sections and accompanying functionality as described herein.

The user can save and later re-open any set of reports using the save button on the toolbar 325.

Figure 5B:
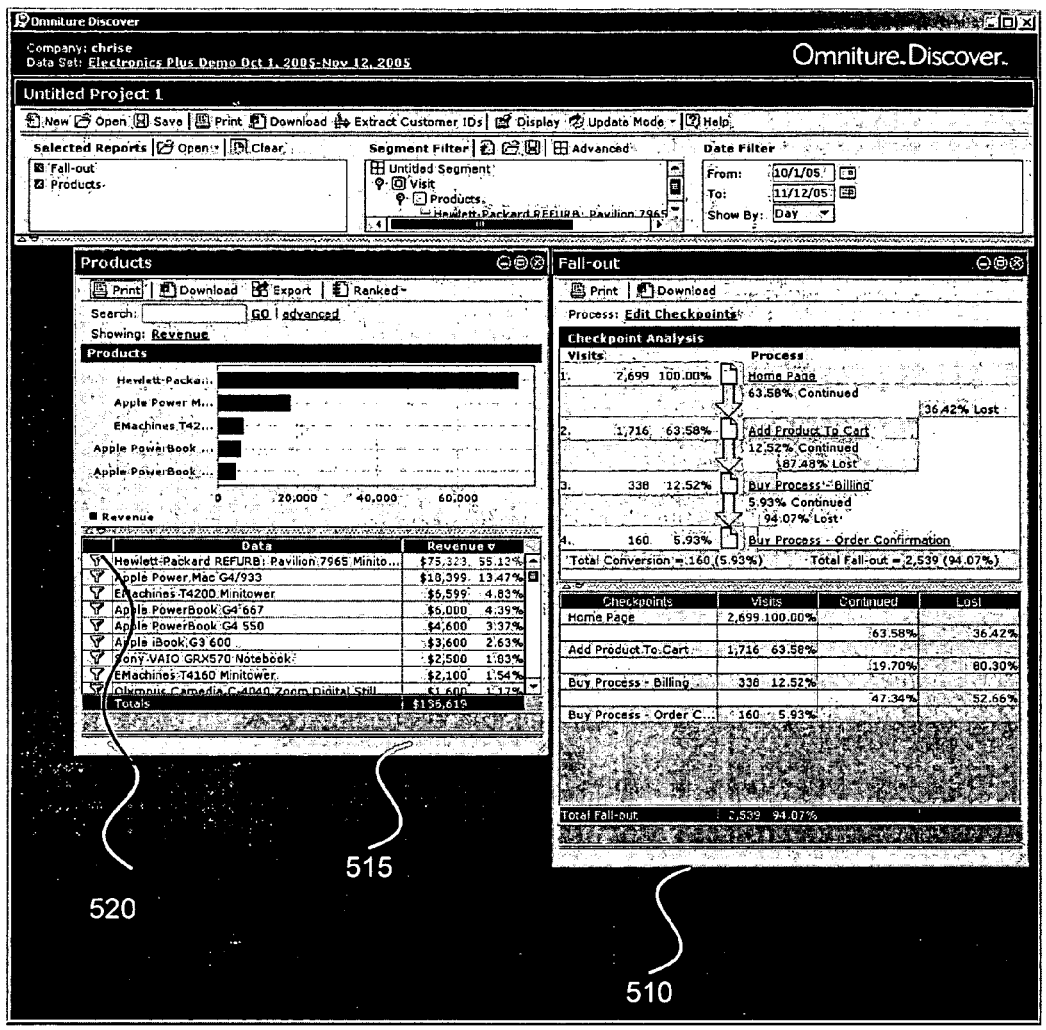

Another example of report filtering is shown in conjunction with FIGS. 5A-5B. In one embodiment, a user can filter the reports 510, 515 by various means. For example, the user can click on a filter icon 520 adjacent to the desired filter criterion. In the reports 510, 515 shown in FIG. 5A, the user applies a filter on "Hewlett-Packard REFURB: Pavilion 7965 Mini . . . " to filter the information to visitors who purchased this product. This is accomplished by clicking on the icon 520. All reports, in this example 510 and 515, then filter based on the criteria selected; thus the fall-out report also shows only data for which the Hewlett-Packard REFURB: Pavilion 7965 Mini was purchased, as shown in FIG. 5B.

The present invention has been described in particular detail with respect to one possible embodiment. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may include a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks include storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer-implemented method for filtering a plurality of reports on website visitation data, the method comprising:
concurrently displaying a plurality of reports of the website visitation data, each associated with one or more respective segmentation criteria, wherein for each of the plurality of defined reports, displaying comprises:
segmenting the website visitation data into one or more segments according to the segmentation criteria associated with the report, wherein each segment is defined by a respective one of the one or more segmentation criteria associated with the report; and
for each of the segments, displaying an indication of the segmentation criterion and a respective value for a given metric for the segment;
receiving a first user input selecting one of the segmentation criteria associated with one of the plurality of reports, and in response to said receiving, automatically filtering the plurality of displayed reports according to the selected segmentation criterion, the filtering comprising:
determining the segment of the website visitation data defined by the selected segmentation criterion; and
for each of the plurality of reports, displaying a filtered version of the report, the filtered version of the report corresponding to the determined segment of the website visitation data and not to portions of the visitation data not in the determined segment, wherein for each report, displaying the filtered version comprises:
segmenting the determined segment into one or more sub-segments each defined by a respective one of the one or more segmentation criteria associated with the report; and
for each of the sub-segments, displaying an indication of the segmentation criterion and a respective value of the given metric for the sub-segment of the determined segment.

2. The computer-implemented method of claim 1, further comprising:
receiving a second user input, the second user input indicating a second segmentation criterion associated with one of the plurality of reports;
determining another segment of the website visitation data dependent on the segmentation criteria respectively indicated by the first and second user inputs;
for each of the plurality of reports, displaying a filtered version of the report, the filtered version corresponding to the determined another segment.

3. The computer-implemented method of claim 2, wherein said determining the another segment of the website visitation data comprises combining the segmentation criteria indicated by the first and second user inputs using an AND operation.

4. The computer-implemented method of claim 2, wherein said determining the another segment of the website visitation data comprises combining the segmentation criteria indicated by the first and second user inputs using an OR operation.

5. The method of claim 1, wherein the plurality of defined reports are user-customized reports built during a current session.

6. A non-transitory computer readable memory storing a computer program executable by a processor, the computer program producing a user interface comprising:
a report display area for displaying a plurality of report instances concurrently, wherein:
each report instance is an instance of a respective defined report, each defined report being associated with one or more respective segmentation criteria; and
wherein each report instance indicates: one or more respective segments of the website visitation data and a respective value of a given metric for each of the one or more respective segments, wherein the one or more respective segments are defined according to the respective segmentation criteria associated with the defined report of which the report instance is an instance;
an first icon associated with one of the segments indicated by one of the report instances;
wherein the report display area is responsive to a user input associated with the first icon to filter the plurality of displayed report instances, said filtering comprising:
determine the first segment of the website visitation data associated with the icon; and
for each of the plurality of defined reports, generating and displaying an instance of the report for the first segment of the website visitation data wherein the report excludes at least a portion of the website visitation data not in the first segment.

7. The non-transitory computer readable memory of claim 6, the user interface further comprising:
a second icon associated with a second segment indicated by another one of the report instances; and
wherein the report display area is responsive to a user input associated with the second icon being detected after the user input associated with the first icon is detected, to:
determine a third segment of the website visitation data, the third segment being dependent on the respective segmentation criteria according to which the first and second segments were respectfully defined; and
for each of the plurality of defined reports, generating and displaying an instance of the report for the determined third segment of the website visitation data.

8. The non-transitory computer readable memory of claim 7, wherein determining the third segment includes combining the respective segmentation criteria according to which the first and second segments were respectfully defined using an OR operation.

9. The non-transitory computer readable memory of claim 6, wherein the plurality of report instances are displayed concurrently.

10. The non-transitory computer readable memory of claim 7, wherein each of the first and second icons corresponds to a respective segmentation criterion according to which the respective segment associated with the icon was defined.

11. The non-transitory computer readable memory of claim 6, the user interface further comprising:
a segment filter area for displaying a summary of one or more segmentation criteria according to which the first segment was defined.

12. The non-transitory computer readable memory of claim 11, the computer program further comprising:
    an executable process that, in response to the user input associated with the first icon, adds a representation of the segmentation criterion according to which the first segment was defined to the segment filter area.

13. The computer-implemented method of claim 1, wherein the defined reports include a fallout report based on a target path specified in terms of checkpoints.

14. The computer implemented method of claim 1, further comprising:
    for one or more of the defined reports: storing an adjusted report as a new one of the plurality of defined reports in a computer storage medium, the adjusted report being associated with the segmentation criterion according to which the first segment was defined.

* * * * *